(12) United States Patent
Yamashita

(10) Patent No.: US 9,350,480 B2
(45) Date of Patent: May 24, 2016

(54) RELAY DEVICE, RELAY METHOD, AND OPTICAL COMMUNICATION SYSTEM WHICH USES RELAY DEVICE

(75) Inventor: Kazuhisa Yamashita, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 97 days.

(21) Appl. No.: 14/126,143

(22) PCT Filed: Apr. 5, 2012

(86) PCT No.: PCT/JP2012/059358
§ 371 (c)(1),
(2), (4) Date: Dec. 13, 2013

(87) PCT Pub. No.: WO2012/176531
PCT Pub. Date: Dec. 27, 2012

(65) Prior Publication Data
US 2014/0112656 A1 Apr. 24, 2014

(30) Foreign Application Priority Data

Jun. 20, 2011 (JP) .................................. 2011-136798
Aug. 8, 2011 (JP) .................................. 2011-173221

(51) Int. Cl.
*H04J 14/02* (2006.01)
*H04B 10/02* (2006.01)
(Continued)

(52) U.S. Cl.
CPC ............ *H04J 14/0221* (2013.01); *H04B 10/27* (2013.01); *H04L 12/12* (2013.01); *H04L 12/44* (2013.01); *Y02B 60/32* (2013.01); *Y02B 60/34* (2013.01)

(58) Field of Classification Search
CPC ... H04J 14/0221; H04B 10/27; H04B 10/272; H04Q 11/0067
USPC .......................................... 398/16, 9, 62, 173
See application file for complete search history.

(56) References Cited

U.S. PATENT DOCUMENTS 7,783,201 B2 * 8/2010 Miura et al. .................. 398/173
8,184,987 B2 * 5/2012 Chen ..................... H04J 3/1694
359/326

(Continued)

FOREIGN PATENT DOCUMENTS

JP 2005-236413 A 9/2005
JP 2007-221688 A 8/2007

(Continued)

OTHER PUBLICATIONS

Yutaro Hara, et al., "A Study of Next Generation Metro-Access Hybrid Scalable Network by Using PLZT Ultra High Speed Optical Wavelength Selective Switch", IECE Technical Report, Feb. 24, 2011, vol. 110, No. 448, pp. 13-18, including partial English translation.

(Continued)

*Primary Examiner* — Oommen Jacob
(74) *Attorney, Agent, or Firm* — Drinker Biddle & Reath LLP

(57) ABSTRACT

A relay device includes a first transmitting and receiving unit connected to a PON line on the upper-level side and performing mutual conversion between optical and electrical signals; a second transmitting and receiving unit connected to a PON line on the lower-level side and performing mutual conversion between optical and electrical signals; a relay processing unit relaying a downstream frame received by the first unit to the second unit, and relays an upstream frame received by the second unit to the first unit; and a control unit. The control unit follows upstream multiple access control performed by a station side device, for transmission of the upstream frame to be transmitted by the first unit to the station side device, and independently performs upstream multiple access control for reception of the upstream frame received by the second unit from a home side device.

19 Claims, 14 Drawing Sheets

(51) Int. Cl.
- *H04J 14/00* (2006.01)
- *H04L 12/44* (2006.01)
- *H04B 10/27* (2013.01)
- *H04L 12/12* (2006.01)

(56) References Cited

U.S. PATENT DOCUMENTS

| | | | | | |
|---|---|---|---|---|---|
| 8,275,268 | B2* | 9/2012 | Kazutaka | H04B 10/077 | 398/11 |
| 8,463,135 | B2* | 6/2013 | Sone | H04J 3/1694 | 398/173 |
| 8,644,707 | B2* | 2/2014 | Gianordoli | H04B 10/29 | 359/341.2 |
| 9,008,516 | B2* | 4/2015 | Li | H04B 10/272 | 398/100 |
| 2006/0239285 | A1* | 10/2006 | Nomura | H04J 3/0682 | 370/408 |
| 2007/0237177 | A1* | 10/2007 | Endo | H04L 47/115 | 370/468 |
| 2007/0274718 | A1* | 11/2007 | Bridges et al. | | 398/63 |
| 2008/0239981 | A1* | 10/2008 | Kanda | H04L 41/0896 | 370/252 |
| 2009/0052894 | A1* | 2/2009 | Murata | H04J 3/1694 | 398/43 |
| 2010/0239251 | A1* | 9/2010 | Biegert | H04Q 11/0067 | 398/58 |
| 2010/0310252 | A1* | 12/2010 | Healey | H04B 10/032 | 398/6 |
| 2012/0093500 | A1* | 4/2012 | Shiba | H04J 14/0246 | 398/25 |
| 2012/0121265 | A1* | 5/2012 | Suvakovic | H04B 10/272 | 398/66 |
| 2012/0163823 | A1* | 6/2012 | Kim | H04J 14/0227 | 398/79 |
| 2012/0257891 | A1* | 10/2012 | Boyd | H04L 47/6215 | 398/45 |
| 2012/0257893 | A1* | 10/2012 | Boyd | H04L 12/2801 | 398/58 |
| 2013/0011142 | A1* | 1/2013 | Goodson | H04Q 11/0067 | 398/98 |
| 2013/0064538 | A1* | 3/2013 | Murata | H04Q 11/0067 | 398/6 |
| 2013/0142515 | A1* | 6/2013 | Chen | H04B 10/27 | 398/67 |
| 2014/0112656 | A1* | 4/2014 | Yamashita | | 398/16 |

FOREIGN PATENT DOCUMENTS

| | | |
|---|---|---|
| JP | 2008-017264 A | 1/2008 |
| JP | 2008-078749 A | 4/2008 |
| JP | 2009-272787 A | 11/2009 |

OTHER PUBLICATIONS

Takeshi Sakamoto, et al., "A Consideration of Control Interface for Energy-efficient 10G-EPON System", IEICE Technical Report, CS2010-2, 2010, including partial English translation.

IEEE Standards, "802.3ah™, IEEE Standard for Information technology—Telecommunications and information exchange between systems—Local and metropolitan area networks—Specific requirements, Part 3: Carrier Sense Multiple Access with Collision Detection (CSMA/CD) Access Method and Physical Layer Specifications, Amendment: Media Access Control Parameters, Physical Layers, and Management Parameters for Subscriber Access Networks", IEEE Std 802.3ah™-2004 (Amendment to IEEE Std 802.3™-2002 as amended by IEEE Stds 802.3ae™-2002, 802.3af™-2002, 802.3aj™-2003 and 802.3ak™-2004), IEEE Computer Society, Sep. 7, 2004, pp. 1-623.

IEEE, "802.3av™, IEEE Standard for Information technology—Telecommunications and information exchange between systems—Local and metropolitan area networks—Specific requirements, Part 3: Carrier Sense Multiple Access with Collision Detection (CSMA/CD) Access Method and Physical Layer Specifications, Amendment 1: Physical Layer Specifications and Management Parameters for 10 Gb/s Passive Optical Networks", IEEE Std 802.3av™-2009 (Amendment of IEEE Std 802.3™-2008), IEEE Computer Society, Oct. 30, 2009, pp. 1-214.

* cited by examiner

RELAY DEVICE, RELAY METHOD, AND OPTICAL COMMUNICATION SYSTEM WHICH USES RELAY DEVICE

TECHNICAL FIELD

The present invention relates to a relay device and a relay method for extending the transmission distance between a station side device and home side devices which form a PON (Passive Optical Network) system, and an optical communication system using the relay device.

BACKGROUND ART

A PON system is an optical communication system that performs optical splitting in a P2MP (Point to Multi Point) connection mode, with no power and includes a station side device; a single-core optical fiber network where an optical fiber connected to the station side device is split into a plurality of optical fibers through an optical coupler; and home side devices connected to ends of the split optical fibers, respectively.

In the PON system, NRZ (Non-Return to Zero) optical signals obtained by directly or externally modulating a light source such as a semiconductor laser are transmitted, by which information is sent and received.

A downstream optical signal sent from the station side device is transmitted to each home side device in broadcast form. Each home side device performs a reception process on only signals destined therefor. On the other hand, upstream optical signals from the home side devices are managed by the station side device using a time-division multiplexing scheme in order to prevent collisions. The station side device receives the upstream optical signals from the home side devices in a burst manner.

In such a PON system, the larger the number of splits and the transmission distance, the poorer the signal quality. Thus, the PON system is normally operated within 32 splits and within a transmission distance of 20 km.

In view of this, there is proposed a PON multiplexing relay device in which in order to extend the transmission distance between a station side device and home side devices as much as possible, eight G-EPONs are multiplexed into 10G by a pair of relay devices which face each other (see Patent Literature 1).

In addition, as another relay device that achieves the extension of the transmission distance, there is also already known a relay device that recovers and synchronizes an optical signal in G-EPON to an electrical signal and relays the optical signal (see Patent Literature 2).

Furthermore, there is also already known sleep control of an intermittent activation scheme where in order to reduce the power consumption of home side devices in a PON system, a home side device stops communication only for a predetermined sleep time, which is triggered by a sleep instruction from a station side device (see Non-Patent Literature 1).

In this sleep control, the station side device transmits a sleep instruction including information on sleep time to a specific home side device. When a predetermined sleep condition is satisfied, the home side device transitions to a sleep state only for the specified sleep time.

CITATION LIST

Patent Literature

Patent Literature 1: Japanese Unexamined Patent Publication No. 2008-017264
Patent Literature 2: Japanese Unexamined Patent Publication No. 2007-221688

Non-Patent Literature

Non-Patent Literature 1: "A Consideration of Control Interface for Energy-efficient 10G-EPON System" (Takeshi Sakamoto and five others) Technical report of IEICE, vol. 110, no. 20, pp. 7-12, April 2010

SUMMARY OF INVENTION

Technical Problem

The relay device described in the above-described Patent Literature 1 employs a scheme in which eight G-EPONs are put together into a 10G relay device. Thus, there are required station side devices, the number of which is equal to that of the G-EPONs, and there are also required interfaces with an upper network, the number of which is equal to that of the station side devices.

Therefore, although the transmission distance between the station side device and the home side devices can be extended, there is a drawback that the system as a whole is not economical.

The relay device described in the above-described Patent Literature 2 is to recover and synchronize an electrical signal obtained by photoelectrically converting a PON optical signal, at the physical layer level. It does not mean that the transmission rate increases upon relaying. Therefore, as with normal PON systems, there is a drawback that when the number of splits is increased, bandwidth decreases.

In addition, if the number of splits is increased, the bandwidth consumed by control messages increases and thus the overall bandwidth that can be used by user data decreases. Accordingly, bandwidth per user decreases, and in the upstream direction unavailable bandwidth for burst overhead increases, further decreasing bandwidth.

In view of such conventional problems, a first object of the present invention is to provide a relay device that can form an optical communication system capable of economically extending the transmission distance.

In addition, a second object of the present invention is to provide a relay device that can form an optical communication system capable of increasing the number of splits while securing bandwidth per user.

Meanwhile, as will be described later, by using relay devices of the present invention, a multi-level connection optical communication system including an upper-level PON and lower-level PONs can be formed.

However, if each of a station side device and relay devices in such a multi-level connection optical communication system is allowed to independently perform the above-described conventional sleep control of an intermittent activation scheme, sleep control for the upper-level PON and the lower-level PONs operate separately and independently, which causes another problem that it may take time to resume traffic.

The reason therefor is as follows. Specifically, when the station side device independently performs sleep control on relay devices under the control thereof and each relay device independently performs sleep control on home side devices under the control thereof, it is rare for the relay device and the home side devices to simultaneously go to sleep. Thus, there is a possibility that the relay device may go to sleep at the same time as when a home side device wakes up. Accordingly, the sleep period when viewed as the entire communication system may become the OR of the sleep period of the relay device and the sleep period of the home side device.

In view of such a problem, a third object of the present invention is to provide a relay device capable of preventing a delay in the resumption of traffic when sleep control is performed in an optical communication system having an upper-level PON and lower-level PONs.

Solution to Problem (1) A relay device of the present invention includes: a first transmitting and receiving unit that performs transmission and reception of optical signals to/from a first PON line on an upper-level side, and mutual conversion between the optical signals and electrical signals; a second transmitting and receiving unit that performs transmission and reception of optical signals to/from a second PON line on a lower-level side, and mutual conversion between the optical signals and electrical signals; a relay processing unit that relays a downstream frame received by the first transmitting and receiving unit to the second transmitting and receiving unit, and relays an upstream frame received by the second transmitting and receiving unit to the first transmitting and receiving unit; and a control unit that follows upstream multiple access control performed by a station side device, for transmission of the upstream frame to be transmitted by the first transmitting and receiving unit to the station side device, and independently performs upstream multiple access control for reception of the upstream frame received by the second transmitting and receiving unit from a home side device.

Solution to Problem

According to the relay device of the present invention, the control unit follows upstream multiple access control performed by the station side device, for transmission of an upstream frame to be transmitted to the station side device, and independently performs upstream multiple access control for reception of an upstream frame to be received from a home side device. Thus, a multi-level connection optical communication system such as that shown in FIG. 1, for example, can be formed that includes an upper-level PON connecting a plurality of relay devices with one station side device at the top; and lower-level PONs each further connecting a plurality of home side devices under the control of a corresponding relay device.

Therefore, not only simply the transmission distance is extended by the intervention of the relay device, but also multiple home side devices can be accommodated for one station side device through the relay device, enabling to suppress the overall cost of the optical communication system.

Hence, an optical communication system capable of economically extending the transmission distance can be formed, attaining the first object.

(2) In the relay device of the present invention, it is preferable that the first transmitting and receiving unit can transmit an upstream optical signal at a higher transmission rate than that of the second transmitting and receiving unit, and the relay processing unit has an upstream buffer for absorbing a difference in upstream transmission rate between the two transmitting and receiving units.

In this case, an optical communication system can be formed in which the upstream transmission rate (e.g., 10G) in an upper-level PON is higher than the upstream transmission rate (e.g., 1G) in a lower-level PON. Thus, even if the number of splits in the upper-level PON is increased, upstream bandwidth per user can be effectively secured.

Hence, an optical communication system capable of increasing the number of splits while securing bandwidth per user can be formed, attaining the second object.

(3) In the relay device of the present invention, it is preferable the first transmitting and receiving unit can receive a downstream optical signal at a higher transmission rate than that of the second transmitting and receiving unit, and the relay processing unit has an downstream buffer for absorbing a difference in downstream transmission rate between the two transmitting and receiving units.

In this case, an optical communication system can be formed in which the downstream transmission rate (e.g., 10G) in an upper-level PON is higher than the downstream transmission rate (e.g., 1G) in a lower-level PON. Thus, even if the number of splits in the upper-level PON is increased, downstream bandwidth per user can be effectively secured.

Hence, an optical communication system capable of increasing the number of splits while securing bandwidth per user can be formed, attaining the second object.

(4) In the relay device of the present invention, it is preferable that the relay processing unit can perform a relay such that there is a one-to-many correspondence between a logical link of the first PON line and logical links of the second PON line.

In this case, the number of logical links of the first PON line depends on the number of relay devices but not on the number of home side devices. Thus, even if the number of home side devices under the control of a relay device is increased, burst overhead and the overhead of control messages do not change, enabling to prevent an unwanted reduction in bandwidth per user.

(5) As the registration and removal sequences to the station side device in this case, it is preferable that the control unit requests the station side device to establish the logical link of the first PON line when any of the logical links of the second PON line is established, and requests the station side device to disconnect the logical link of the first PON line when all of the logical links of the second PON line are disconnected.

By the control unit of the relay device requesting the station side device to establish and disconnect the logical link of the first PON line in a procedure such as that described above, when there are no home side devices in operation under the relay device, the relay device is not registered with the station side device.

Hence, wasteful control messages are not generated between the station side device and the relay device, enabling to prevent an unwanted reduction in user bandwidth in the upper-level PON.

(6) In the relay device of the present invention, the relay processing unit can perform a relay such that there is a one-to-one correspondence between a logical link of the first PON line and a logical link of the second PON line.

In this case, the station side device can manage logical links having a one-to-one correspondence with home side devices, enabling to implement fine-grained QoS control on a per home side device basis and better fairness among the home side devices.

(7) As the registration and removal sequence to the station side device in this case, the control unit requests the station side device to establish the logical link of the first PON line every time the logical link of the second PON line is established, and requests the station side device to disconnect the logical link of the first PON line every time the logical link of the second PON line is disconnected.

By doing so, while securing a one-to-one correspondence between logical links provided between the PON lines, home side devices under the control of the relay device can be appropriately registered with and removed from the station side device.

(8) In this case, the relay processing unit: relays a loopback set request from the station side device, to the home side device and relays a loopback set response from the home side device, to the station side device; and relays a loopback test frame from the station side device, to the home side device and relays a loopback test frame from the home side device, to the station side device.

By doing so, the station side device can perform an OAM loopback test, with the upper-level PON and the lower-level PON linked to each other. Therefore, trouble related to a buffer, etc., in the relay device can also be detected, enabling to further improve the maintainability of the optical communication system.

(9) In the relay device of the present invention, the relay processing unit establishes an association between the logical link of the first PON line and the logical links of the second PON line, for logical links of a same service class.

In this case, even if a plurality of logical links associated with service classes are formed in one home side device, a one-to-many or one-to-one association between logical links provided between the PON lines can be established.

By doing so, since the association between logical links and service classes matches throughout the station side device, the relay device, and the home side devices, fine-grained QoS control on a per service class basis can be securely implemented.

(10) In the relay device of the present invention, the control unit generates a second sleep instruction for the home side device from a first sleep instruction obtained from the station side device, according to a predetermined correspondence relationship between the two PON lines.

In this case, a first sleep instruction in the upper-level PON is converted by the relay device to a second sleep instruction in the lower-level PON, and the second sleep instruction is transmitted to a home side device. Thus, the station side device in the upper-level PON can intensively control the sleep operation of the home side device in the lower-level PON.

Hence, in a multi-level connection optical communication system having an upper-level PON and lower-level PONs, compared to the case of performing sleep control separately for the upper-level PON and the lower-level PONs, the sleep period of the entire system is not prolonged. Thus, a delay in the resumption of traffic can be prevented, attaining the third object.

(11) In the relay device of the present invention, when the predetermined correspondence relationship is such that there is a one-to-many correspondence between a logical link of the first PON line and logical links of the second PON line, the control unit generates a plurality of second sleep instructions for all of the logical links of the second PON line from one first sleep instruction.

In this case, if second sleep responses to a plurality of second sleep instructions include both "Ack" and "Nack", in order to put the downstream reception function of a home side device having responded "Ack" to sleep and continue downstream transmission to a home side device having responded "Nack", the relay device needs to temporarily buffer downstream frames destined for the home side device having responded "Ack" during a sleep period and transmit the downstream frames after the sleep period has ended. Hence, mechanisms for buffering are required individually for the home side devices, increasing the manufacturing cost of the relay device. On the other hand, by limiting the sleep operation of the home side devices to the upstream transmission function, there is no need to buffer downstream frames during a sleep period.

Hence, the station side device in the upper-level PON can intensively control the sleep operation of the upstream transmission functions of the home side devices in the lower-level PON.

(12) It is preferable that the control unit performs sleep operation of the relay device where an upstream transmission function of at least one of the first transmitting and receiving unit and a part of the relay processing unit is suspended, when second sleep responses to the plurality of second sleep instructions are all Ack.

By doing so, the upstream transmission of the relay device can be put to sleep on condition that all home side devices under the control of the relay device put their upstream transmission to sleep. Thus, the power savings of the relay device can also be achieved.

(13) On the one hand, when the predetermined correspondence relationship is such that there is a one-to-one correspondence between a logical link of the first PON line and a logical link of the second PON line, the control unit generates one second sleep instruction from one first sleep instruction, and generates one first sleep response to the first sleep instruction from one second sleep response to the second sleep instruction, the first sleep response having same acknowledge/unacknowledge content as the second sleep response.

In this case, since the station side device in the upper-level PON can obtain acknowledge/unacknowledge content from a home side device in the lower-level PON in response to a sleep instruction, the station side device can perform sleep control on both of the upstream transmission function and downstream reception function of the home side device.

Hence, the station side device in the upper-level PON can intensively control the sleep operation of the upstream transmission functions and downstream reception functions of the home side devices in the lower-level PON.

In addition, in this case, the relay device provides sleep instructions to home side devices under the control thereof in one-to-one conjunction with a sleep instruction from the station side device. Therefore, during the sleep period of a home side device, the relay device does not receive downstream frames destined for the home side device from the station side device.

Hence, a memory for buffering downstream traffic during a sleep period does not need to be provided in the relay device, providing the advantage of being able to reduce the manufacturing cost of the relay device.

(14) It is preferable that the control unit performs sleep operation of the relay device where an upstream transmission function and/or a downstream reception function of at least one of the first transmitting and receiving unit and a part of the relay processing unit is/are suspended, during a period during which sleep periods provided based on a plurality of second sleep instructions overlap each other.

By doing so, the upstream transmission and downstream reception of the relay device can be put to sleep on condition that the sleep periods of home side devices under the control of the relay device overlap each other. Thus, the power savings of the relay device can also be achieved.

(15) An optical communication system of the present invention includes: a station side device; a plurality of relay devices described in the above-described (1) to (14) connected to the station side device in a P2MP manner; and a plurality of home side devices connected to each relay device in a P2MP manner.

As such, since the optical communication system of the present invention includes a relay device of the present invention described in the above-described (1) to (14), the same functions and effects as those of the relay device can be provided.

(16) The present method is a method for relaying a downstream frame received from a first PON line, to a second PON line and relaying an upstream frame received from the second PON line, to the first PON line. The method includes: following upstream multiple access control performed by a station side device, for transmission of the upstream frame to be transmitted to the station side device using the first PON line; and independently performing upstream multiple access control for reception of the upstream frame received from a home side device using the second PON line.

As described above, the method of the present invention is a relay method performed by a relay device of the present invention described in the above-described (1). Therefore, the method of the present invention provides the same functions and effects as those of the relay device of the present invention described in the above-described (1).

(17) It is preferable that the present method includes generating a second sleep instruction for the home side device, based on a first sleep instruction obtained from the station side device, according to a predetermined correspondence relationship between the two PON lines.

The above-described relay method is a relay method performed by a relay device of the present invention described in the above-described (10). Therefore, the above-described relay method provides the same functions and effects as those of the relay device of the present invention described in the above-described (10).

(18) Note that a relay device of the present invention does not necessarily require the configuration described in the above-described (1) and may have the following configuration.

A relay device includes:

a first transmitting and receiving unit that performs transmission and reception of optical signals to/from a first PON line on an upper-level side, and mutual conversion between the optical signals and electrical signals;

a second transmitting and receiving unit that performs transmission and reception of optical signals to/from a second PON line on a lower-level side, and mutual conversion between the optical signals and electrical signals;

a relay processing unit that relays a downstream frame received by the first transmitting and receiving unit to the second transmitting and receiving unit, and relays an upstream frame received by the second transmitting and receiving unit to the first transmitting and receiving unit; and a control unit that generates a second sleep instruction for the home side device from a first sleep instruction obtained from the station side device, according to a predetermined correspondence relationship between the two PON lines.

Even with the relay device having such a configuration, since the control unit performs the control described in the above-described (10), the third object can be attained.

Advantageous Effects of Invention

As described above, according to the present invention, an optical communication system capable of economically extending the transmission distance can be formed. In addition, according to the present invention, an optical communication system capable of increasing the number of splits while securing bandwidth per user can be formed.

Furthermore, according to the present invention, when sleep control is performed in an optical communication system having an upper-level PON and lower-level PONs, a delay in the resumption of traffic can be prevented.

DESCRIPTION OF EMBODIMENTS

Embodiments of the present invention will be described below based on the drawings.

First Embodiment

[Connection mode of an optical communication system]

Figure 1:
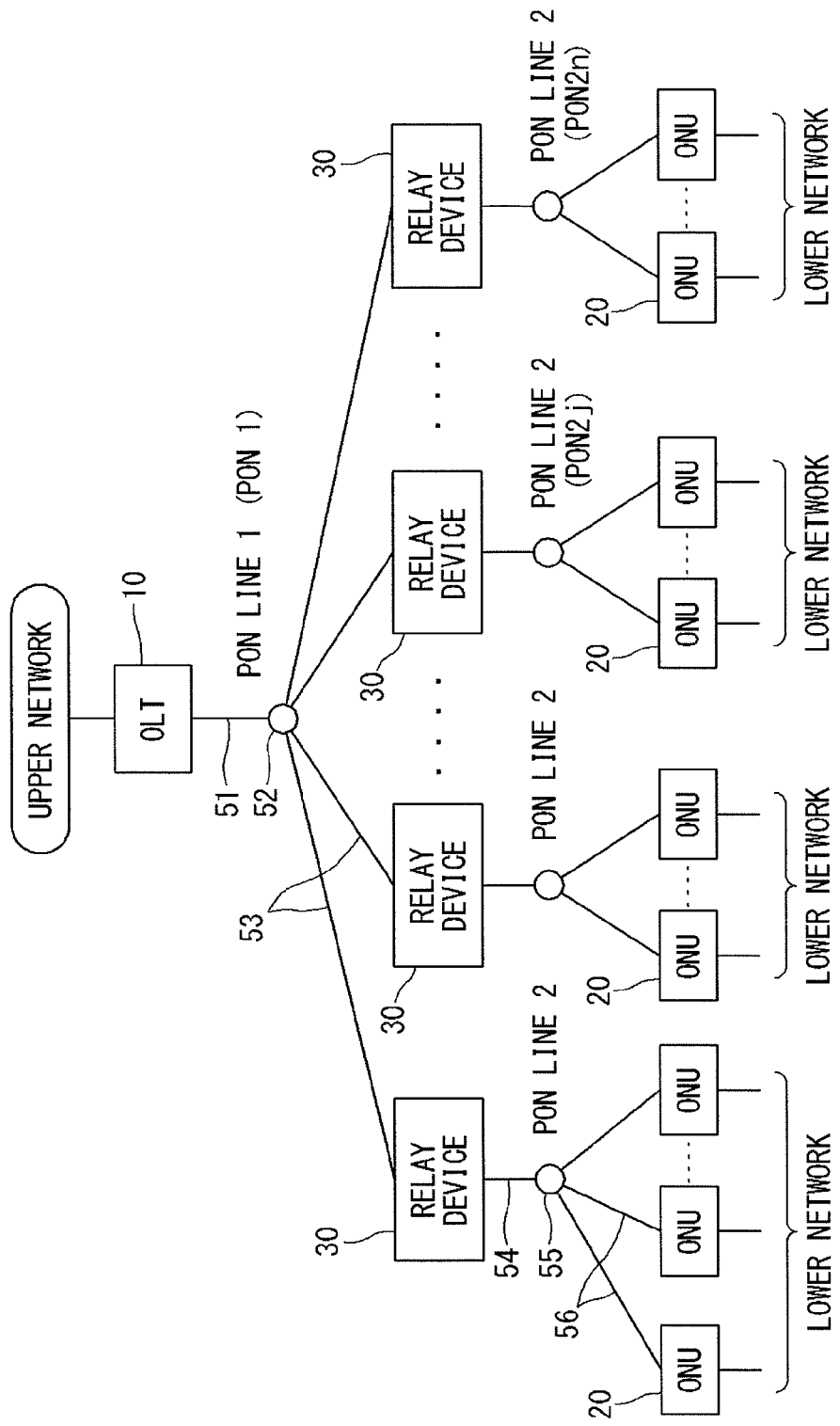
FIG. 1 is a diagram showing a connection mode of an optical communication system according to a first embodiment of the present invention.

FIG. 1 is a diagram showing a connection mode of an optical communication system according to a first embodiment of the present invention.

As shown in FIG. 1, the optical communication system of the present embodiment has a connection mode (topology) in which one station side device 10 and multiple home side devices 20 are connected to each other with a plurality of relay devices 30 therebetween serving as intermediaries and by PON lines 1 and 2 at upper and lower levels.

Specifically, the one station side device 10 is connected to the plurality of relay devices 30 under the control thereof by optical fibers in a P2MP manner. Each relay device 30 is connected to a plurality of home side devices 20 under the control thereof by optical fibers in a P2MP manner.

More specifically, a single-core optical fiber 51 connected to the station side device 10 is split into a plurality of single-core optical fibers 53 through an optical coupler 52 which is a passive optical branch node. The relay devices 30 are connected to ends of the split optical fibers 53, respectively.

In addition, a single-core optical fiber 54 connected to the lower-level side of each relay device 30 is split into a plurality of single-core optical fibers 56 through an optical coupler 55 which is a passive optical branch node. Home side devices 20 are connected to ends of the split optical fibers 56, respectively.

Therefore, only one PON line 1 on the upper-level side including an optical fiber network 51 to 53 is present for one OLT 10. PON lines 2 on the lower side each including an optical fiber network 54 to 56 are present for the plurality of relay devices 30 so as to be in the same number as the relay devices 30.

Note that in the following a PON on the upper-level side including the station side device 10, the PON line 1, and the plurality of relay devices 30 may be called a "PON 1", an "upper-level PON", or the like, and a PON on the lower-level side including a relay device 30, a PON line 2, and a plurality of home side devices 20 may be called a "PON 2j" (j=1, 2 n: n is the maximum number of the relay devices 30), a "lower-level PON", or the like.

Note also that in the following the "station side device" may be abbreviated as "OLT" (Optical Line Terminal) and the "home side device" may be abbreviated as "ONU" (Optical Network Unit).

Furthermore, in the present embodiment, the PON 1 on the upper-level side between the station side device 10 and the relay devices 30 is 10G-EPON with a transmission rate of 10G (specifically, 10.3125 Gbps), and a PON 2j on the lower-level side between a relay device 30 and home side devices 20 is G-EPON with a transmission rate of 1G (specifically, 1.25 Gbps).

[Configuration of the Station Side Device]

Figure 2:
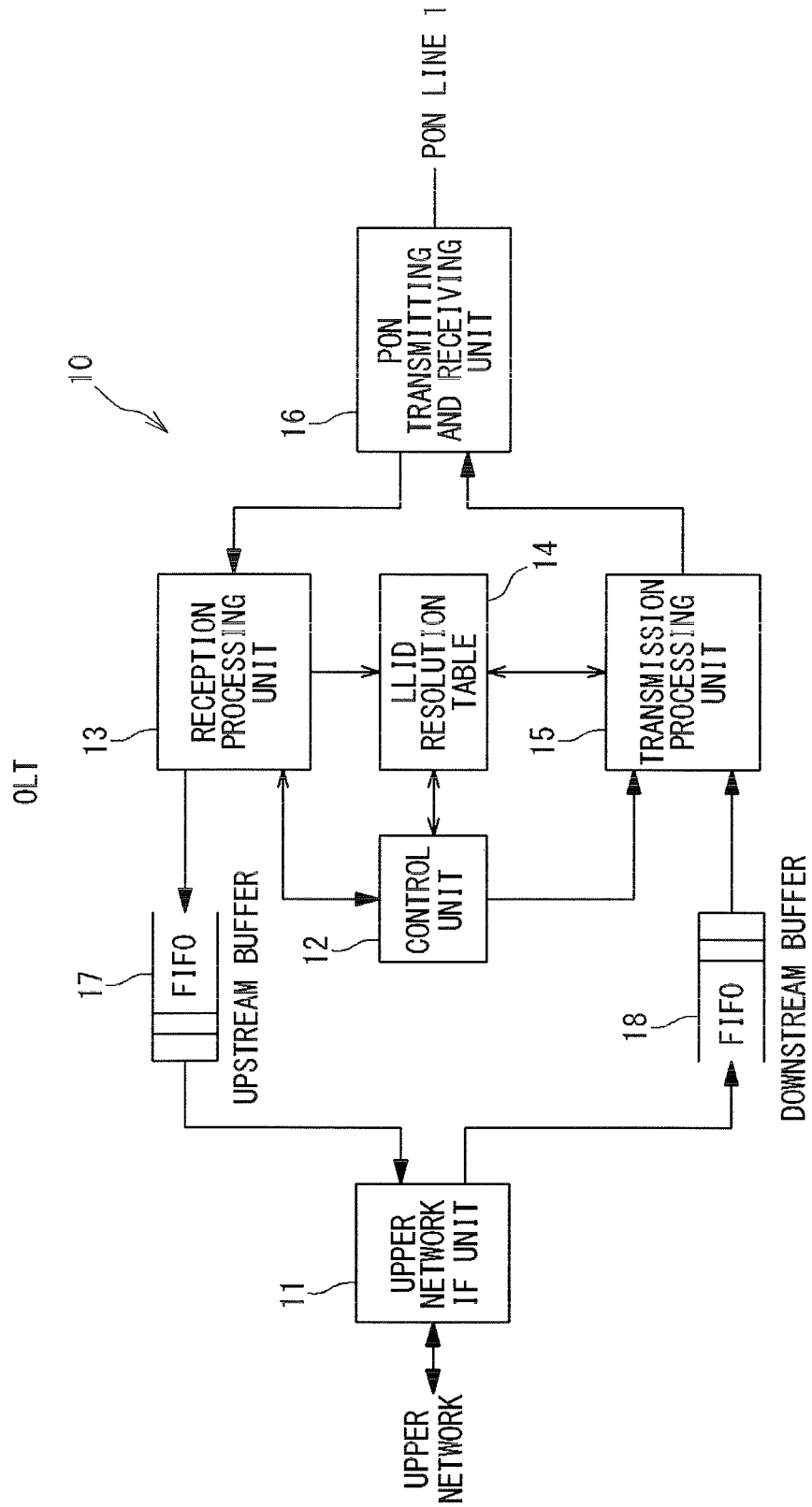
FIG. 2 is a block diagram showing a configuration of a station side device.

FIG. 2 is a block diagram showing a configuration of the station side device 10.

As shown in FIG. 2, the OLT 10 includes an upper network IF (interface) unit 11, a control unit 12, a reception processing unit 13, an LLID (Logical Link ID) resolution table 14, a transmission processing unit 15, and a PON transmitting and receiving unit 16 in order from the upper side (the left side in FIG. 2) to the lower side. In addition, the OLT 10 includes an upstream buffer 17 and a downstream buffer 18.

The PON transmitting and receiving unit 16 converts a 1.27 μm-band optical signal inputted from the PON line 1 into an electrical signal and outputs the electrical signal to the reception processing unit 13, and converts an electrical signal inputted from the transmission processing unit 15 into a 1.577 μm-band optical signal and outputs the optical signal to the PON line 1.

The reception processing unit 13 reconstructs a frame from the electrical signal inputted from the PON transmitting and receiving unit 16. If the frame type is a control frame or an OAM loopback test frame, the reception processing unit 13 outputs it to the control unit 12.

Alternatively, if the frame type is a user frame, the reception processing unit 13 outputs it to the upstream buffer 17, and learns the association between a source MAC address and an LLID and records the association in the LLID resolution table 14. Note that LLIDs in an OAM loopback state are notified from the control unit 12.

If there is a frame in the upstream buffer 17, the upper network IF unit 11 extracts and outputs the frame to an upper network. When a frame is inputted from the upper network, the upper network IF unit 11 outputs the frame to the downstream buffer 18.

The transmission processing unit 15 outputs, as an electrical signal, a frame inputted from the control unit 12, to the PON transmitting and receiving unit 16. If there is a frame in the downstream buffer 18, the transmission processing unit 15 extracts the frame from the downstream buffer 18 during the intervals between frames sent from the control unit 12 and outputs, as an electrical signal, the frame to the PON transmitting and receiving unit 16.

At this time, the transmission processing unit 15 assigns a value determined by referring to the LLID resolution table 14 on the basis of a destination MAC address, as the LLID of a user frame.

The control unit 12 generates control frames such as an MPCP frame and an OAM frame which operate and manage an ONU 20, and transmits the control frames to the ONU 20 through the transmission processing unit 15, and receives, through the reception processing unit 13, a control frame such as an MPCP frame or an OAM frame sent from an ONU 20, and performs a process appropriate to the content of the control frame.

In addition, the control unit 12 notifies the reception processing unit 13 of LLIDs under OAM loopback tests. Note that in the first embodiment, in upstream multiple access control in the PON 1 performed by the control unit 12 of the OLT 10 using MPCP frames, the relay devices 30 function as the ONUs 20.

In the present embodiment, since the upper-level PON 1 is 10G-EPON, optical signals sent and received from/by the OLT 10 are transmitted at 10.3125 Gbps, and the rate of an electrical signal before encoding is 10 Gbps.

[Configuration of the Home Side Devices]

Figure 3:
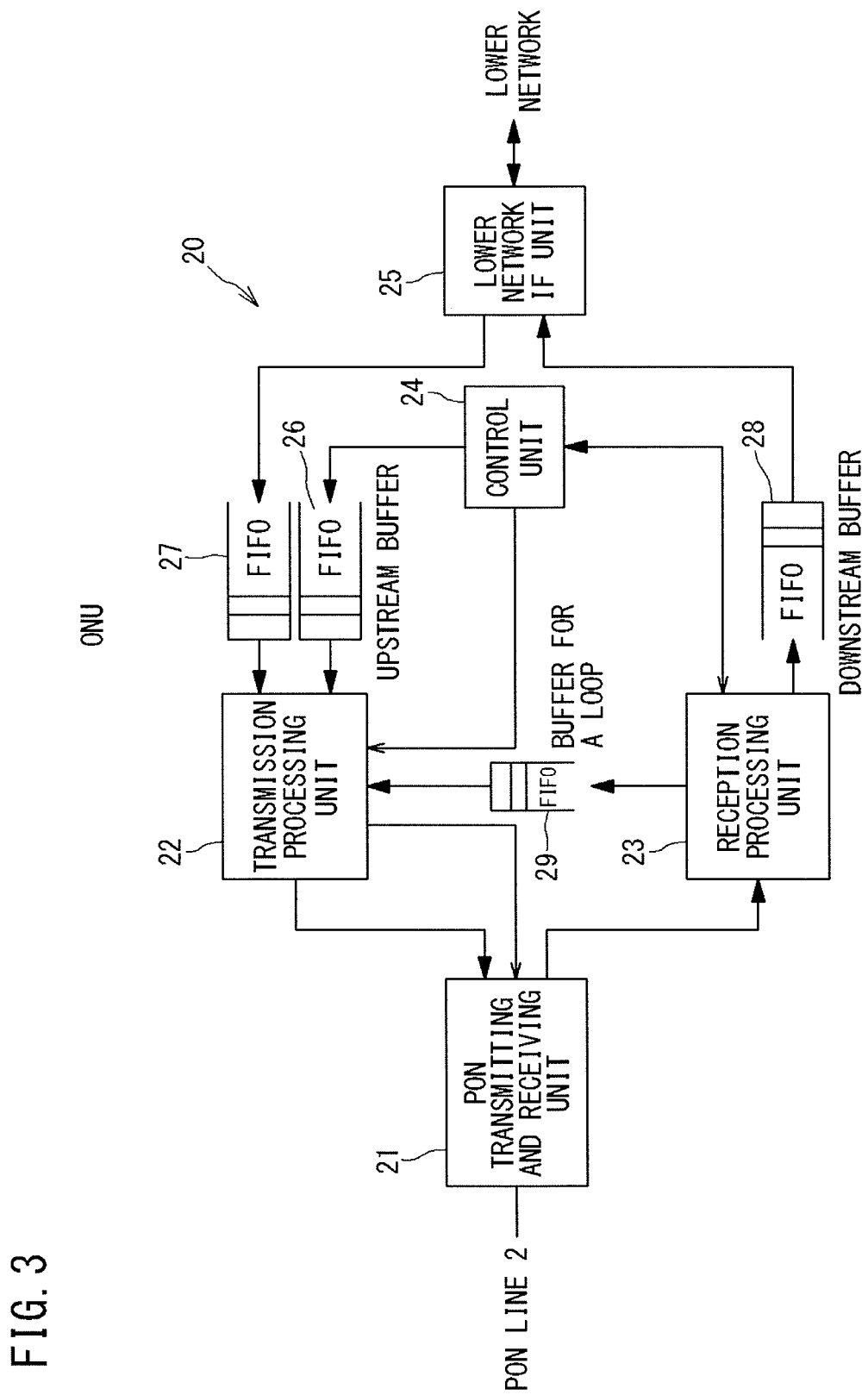
FIG. 3 is a block diagram showing a configuration of a home side device.

FIG. 3 is a block diagram showing a configuration of a home side device 20.

As shown in FIG. 3, the ONU 20 includes a PON transmitting and receiving unit 21, a transmission processing unit 22, a reception processing unit 23, a control unit 24, and a lower network IF (interface) unit 25 in order from the upper side (the left side in FIG. 3) to the lower side.

In addition, the ONU 20 includes two types of upstream buffers 26 and 27, a downstream buffer 28, and a buffer for a loop 29. The first upstream buffer 26 is for control frames, and the second upstream buffer 27 is for user frames.

The PON transmitting and receiving unit 21 converts a 1.49 μm-band optical signal inputted from the PON line 2 into an electrical signal and outputs the electrical signal to the reception processing unit 23, and converts an electrical signal inputted from the transmission processing unit 22 into a 1.3 μm-band optical signal and outputs the optical signal to the PON line 2.

Note that the optical signal outputted from the PON transmitting and receiving unit 21 of the ONU 20 is a burst signal that does not emit light during a period during which a burst enable signal inputted from the transmission processing unit 22 is off.

The reception processing unit 23 reconstructs a frame from the electrical signal inputted from the PON transmitting and receiving unit 21, and discards a frame whose LLID is not destined for the ONU 20 and a frame that does not have a broadcast LLID.

In addition, the reception processing unit 23 checks the frame type of a frame that has not been discarded. If the frame is a control frame, the reception processing unit 23 outputs the frame to the control unit 24. If the frame is a user frame, the reception processing unit 23 outputs the frame to the downstream buffer 28.

Note, however, that when the ONU 20 is in an OAM loopback state, the reception processing unit 23 outputs the user frame to the buffer for a loop 29. Note that LLIDs in an OAM loopback state are notified from the control unit 24.

If there is a frame in the downstream buffer 28, the lower network IF unit 25 extracts and converts the frame into a signal appropriate to a medium in a lower network, and outputs the signal. In addition, when the lower network IF unit 25 receives a signal from the lower network, the lower network IF unit 25 converts the signal into an internal signal and then reconstructs a frame and outputs the frame to the second upstream buffer 27.

The transmission processing unit 22 sends out, as an electrical signal, a report frame generated thereby or frames extracted from the first upstream buffer 26, the second upstream buffer 27, and the buffer for a loop 29 to the PON transmitting and receiving unit 21 during an instructed period, according to a transmission instruction from the control unit 24. At this time, the transmission processing unit 22 enables a burst enable signal.

The transmission instruction from the control unit 24 includes a frame target (whether the frame is a report frame), the transmission start time, and the transmission period.

If the instructed target is a report frame, the transmission processing unit 22 transmits a report frame. If the instructed target is not a report frame, the transmission processing unit 22 transmits a frame in the first upstream buffer 26, the second upstream buffer 27, or the buffer for a loop 29.

Extraction of a frame from each of the buffers 26, 27, and 29 is performed such that an already reported one is given priority, and priority is given in order of the first upstream buffer 26, the second upstream buffer 27, and the buffer for a loop 29.

When the transmission processing unit 22 is instructed by the control unit 24 to generate a report frame, the transmission processing unit 22 generates a report frame by referring to the amount of information saved in the buffers 26, 27, and 29. At this time, the transmission processing unit 22 does not include in a report a series of frames corresponding to a grant length given as an argument.

In addition, upon converting a frame into an electrical signal, the transmission processing unit 22 assigns a broadcast LLID to a registration request frame, and assigns the LLID of the ONU 20 to other frames.

The control unit 24 receives through the reception processing unit 23 an MPCP frame and an OAM frame sent from the OLT 10 and performs processes appropriate to those control frames, and transmits responses thereto or an MPCP frame and an OAM frame generated thereby to the OLT 10 through the transmission processing unit 22.

In addition, when the OAM loopback state has been changed, the control unit 24 notifies the reception processing unit 23 of the change in the state.

In the present embodiment, since the PON 2j on the lower-level side is G-EPON, optical signals sent and received from/by the ONU 20 are transmitted at 1.25 Gbps, and the rate of an electrical signal before encoding is 1 Gbps.

[Configuration of the Relay Devices]

Figure 4:
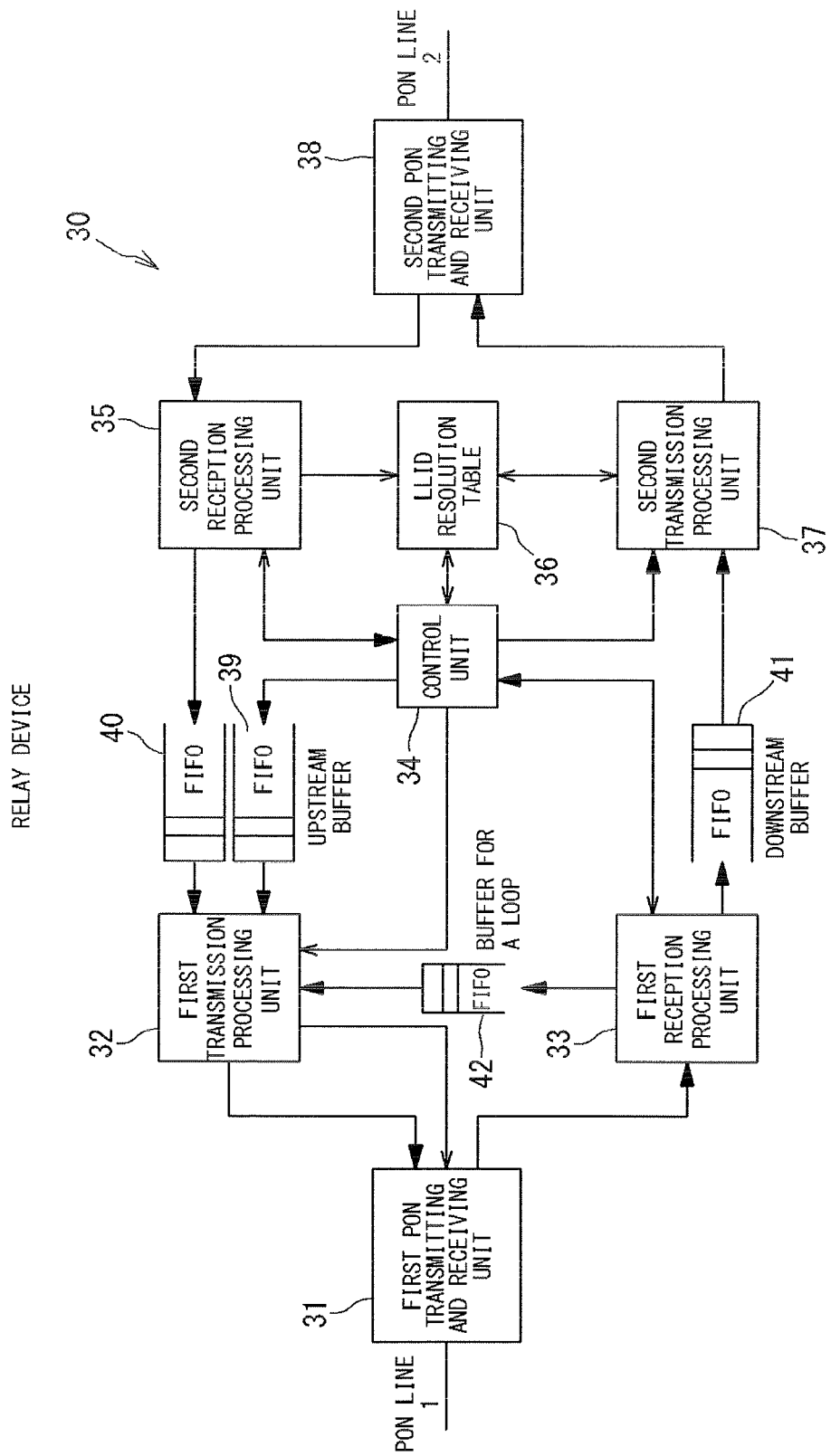
FIG. 4 is a block diagram showing a configuration of a relay device.

FIG. 4 is a block diagram showing a configuration of a relay device 30.

As shown in FIG. 4, the relay device 30 includes a first PON transmitting and receiving unit 31, a first transmission processing unit 32, a first reception processing unit 33, a control unit 34, a second reception processing unit 35, an LLID resolution table 36, a second transmission processing unit 37, and a second PON transmitting and receiving unit 38 in order from the upper side (the left side in FIG. 4) to the lower side.

In addition, the relay device 30 includes two types of upstream buffers 39 and 40, a downstream buffer 41, and a buffer for a loop 42. The first upstream buffer 39 is for control frames, and the second upstream buffer 40 is for user frames.

The first PON transmitting and receiving unit 31 converts a 1.577 μm-band optical signal inputted from the PON line 1 into an electrical signal and outputs the electrical signal to the first reception processing unit 33, and converts an electrical signal inputted from the first transmission processing unit 32 into a 1.27 μm-band optical signal and outputs the optical signal to the PON line 1.

Note that the optical signal outputted from the first PON transmitting and receiving unit 31 of the relay device 30 is a burst signal that does not emit light during a period during which a burst enable signal inputted from the first transmission processing unit 32 is off.

The first reception processing unit 33 reconstructs a frame from the electrical signal inputted from the first PON transmitting and receiving unit 31, and discards a frame whose LLID is not destined for the relay device 30 and a frame that does not have a broadcast LLID.

In addition, the first reception processing unit 33 checks the frame type of a frame that has not been discarded. If the frame is a control frame, the first reception processing unit 33 outputs the frame to the control unit 34. If the frame is a user frame, the first reception processing unit 33 outputs the frame to the downstream buffer 41.

Note, however, that when the relay device 30 is set to an OAM loopback state from the PON line 1, the first reception processing unit 33 outputs the user frame to the buffer for a loop 42. Note that the enable/disable of an OAM loopback state is notified from the control unit 34.

The first transmission processing unit 32 sends out, as an electrical signal, a report frame generated thereby or frames extracted from the first upstream buffer 39, the second upstream buffer 40, and the buffer for a loop 42 to the first PON transmitting and receiving unit 31 during an instructed period, according to a transmission instruction from the control unit 34. At this time, the first transmission processing unit 32 enables a burst enable signal.

The transmission instruction from the control unit 34 includes a frame target (whether the frame is a report frame), the transmission start time, and the transmission period.

If the instructed target is a report frame, the first transmission processing unit 32 transmits a report frame. If the instructed target is not a report frame, the first transmission processing unit 32 transmits a frame in the first upstream buffer 39, the second upstream buffer 40, or the buffer for a loop 42.

Extraction of a frame from each of the buffers 39, 40, and 42 is performed such that an already reported one is given priority, and priority is given in order of the first upstream buffer 39, the second upstream buffer 40, and the buffer for a loop 42.

When the first transmission processing unit 32 is instructed by the control unit 34 to generate a report frame, the first transmission processing unit 32 generates a report frame by referring to the amount of information saved in the buffers 39, 40, and 42. At this time, the first transmission processing unit 32 does not include in a report a series of frames corresponding to a grant length given as an argument.

In addition, upon converting a frame into an electrical signal, the first transmission processing unit 32 assigns a broadcast LLID to a registration request frame, and assigns the LLID of a corresponding ONU 20 to other frames.

The control unit 34 receives through the first reception processing unit 33 an MPCP frame and an OAM frame sent from the OLT 10 and performs processes appropriate to those control frames, and transmits responses thereto or an MPCP frame and an OAM frame generated thereby to the OLT 10 through the first transmission processing unit 32.

Namely, the control unit 34 follows upstream multiple access control performed by the OLT 10, for the transmission timing of upstream frames transmitted from the first PON transmitting and receiving unit 31.

In addition, when the OAM loopback state has been changed, the control unit 34 notifies the first reception processing unit 33 of the change in the state.

In the present embodiment, since the PON 1 on the upper-level side is 10G-EPON, optical signals sent and received to/from the PON line 1 by the relay device 30 are transmitted at 10.3125 Gbps, and the rate of an electrical signal before encoding is 10 Gbps. In addition, since the PON 2j on the lower-level side is G-EPON, optical signals sent and received to/from the PON line 2 by the relay device 30 are transmitted at 1.25 Gbps, and the rate of an electrical signal before encoding is 1 Gbps.

The second PON transmitting and receiving unit 38 converts a 1.31 µm-band optical signal inputted from the PON line 2 into an electrical signal and outputs the electrical signal to the second reception processing unit 35, and converts an electrical signal inputted from the second transmission processing unit 37 into a 1.49 µm-band optical signal and outputs the optical signal to the PON line 2.

The second reception processing unit 35 reconstructs a frame from the electrical signal inputted from the second PON transmitting and receiving unit 38. If the frame type is a control frame or an OAM loopback frame, the second reception processing unit 35 outputs it to the control unit 34.

Alternatively, if the frame type is a user frame, the second reception processing unit 35 outputs it to the second upstream buffer 40, and learns the association between a source MAC address and an LLID and records the association in the LLID resolution table 36. Note that LLIDs in an OAM loopback state are notified from the control unit 34.

The second transmission processing unit 37 outputs, as an electrical signal, a frame inputted from the control unit 34, to the second PON transmitting and receiving unit 38 and extracts, if there is a frame in the downstream buffer 41, the frame from the downstream buffer 41 during the intervals between frames sent from the control unit 34 and outputs, as an electrical signal, the frame to the second PON transmitting and receiving unit 38.

At this time, the second transmission processing unit 37 assigns a value determined by referring to the LLID resolution table 36 on the basis of a destination MAC address, as the LLID of a user frame.

As such, in the present embodiment, the relay device 30 individually grasps the correspondence relationship between the LLIDs of user frames sent out from ONUs 20 and their source MAC addresses (the MAC addresses of the ONUs 20) by the LLID resolution table 36, and manages the LLIDs of the ONUs 20 under the control thereof based on the resolution table 36. Therefore, there is a one-to-many correspondence between a logical link used by the PON line 1 and logical links used by the PON line 2j.

The control unit 34 generates control frames such as an MPCP frame and an OAM frame which operate and manage an ONU 20, and transmits the control frames to the ONU 20 through the second transmission processing unit 37, and receives, through the second reception processing unit 35, a control frame such as an MPCP frame or an OAM frame sent from an ONU 20, and performs a process appropriate to the content of the control frame.

Namely, the control unit 34 performs upstream multiple access control for the reception timing of an upstream frame received by the second PON transmitting and receiving unit 38, independently and separately from the OLT 10.

In addition, the control unit 34 notifies the second reception processing unit 35 of LLIDs in an OAM loopback test state in the PON line 2.

In addition, although the control unit 34 can individually establish MPCP links with the PON 1 and the PON 2j, the control unit 34 performs a registration sequence and a removal sequence of MPCP links in the upper-level PON and the lower-level PON such that the upper-level PON and the lower-level PON are associated with each other. Details of the sequences will be described in subsequent FIGS. 5 and 6.

In the relay device 30 of FIG. 4, the "first reception processing unit 33", the "downstream buffer 41", and the "second transmission processing unit 37" provided between the first PON transmitting and receiving unit 31 and the second PON transmitting and receiving unit 38 compose a downstream "relay processing unit" that relays downstream frames received by the first PON transmitting and receiving unit 31 to the second PON transmitting and receiving unit 38.

The "second reception processing unit 35", the "upstream buffer 40", and the "first transmission processing unit 32" provided between the second PON transmitting and receiving unit 38 and the first PON transmitting and receiving unit 31 compose an upstream "relay processing unit" that relays upstream frames received by the second PON transmitting and receiving unit 38 to the first PON transmitting and receiving unit 31.

As described previously, in the present embodiment, the upper-level PON 1 is 10G-EPON and the lower-level PON 2j is G-EPON and thus their transmission rates differ between the upper-level side and lower-level side of the relay device 30.

Hence, in the relay device 30 of the present embodiment, the difference in transmission rate between the higher-speed PON 1 and the lower-speed PON 2j is absorbed by the second upstream buffer 40 and the downstream buffer 41 which compose the above-described relay processing units.

[Registration Sequence]

Figure 5:
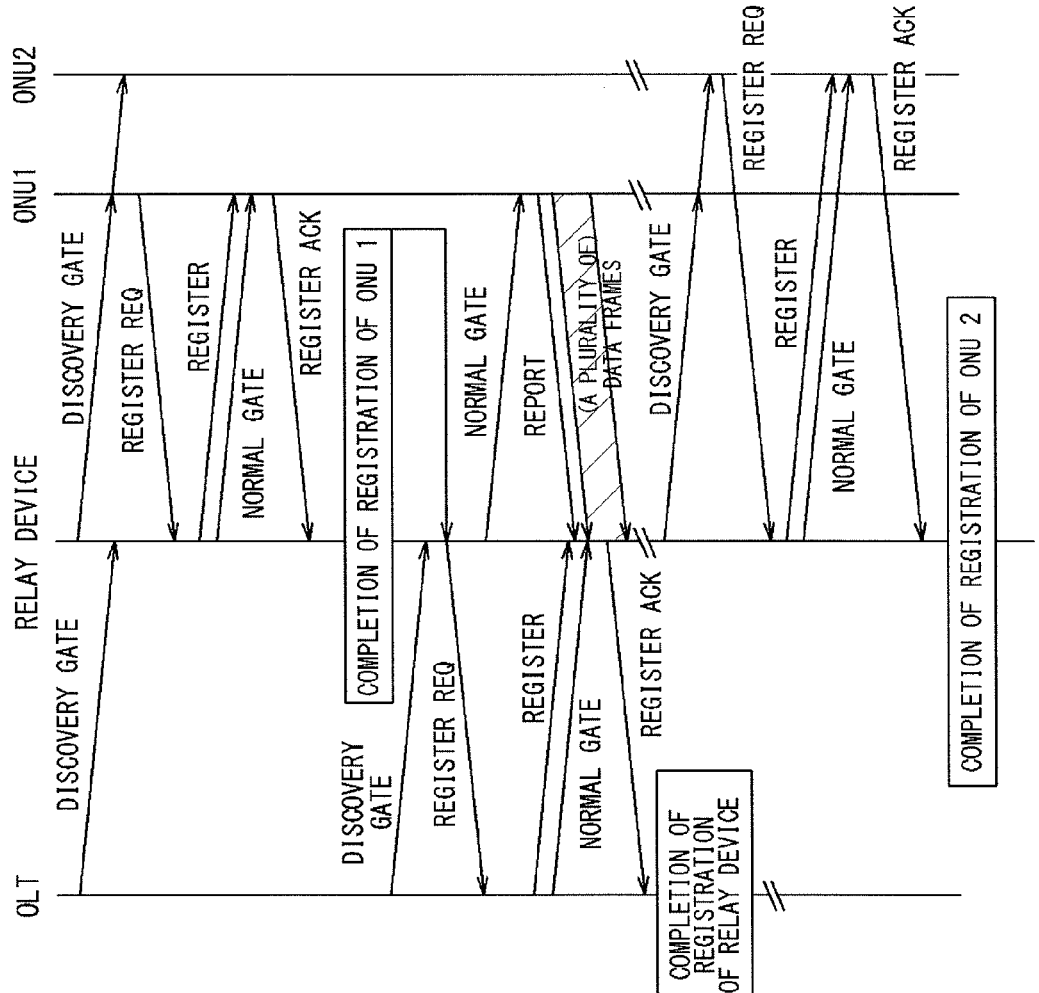
FIG. 5 is a diagram showing a registration sequence with the station side device.

FIG. 5 is a diagram showing a registration sequence of ONUs 20 and a relay device 30 with the OLT 10 in the optical communication system of the first embodiment.

More specifically, FIG. 5 shows the association between MPCP messages exchanged between the relay device 30 and the OLT 10 to register the relay device 30 with the OLT 10, and MPCP messages exchanged between the ONUs 20 and the relay device 30 to register the ONUs 20 with the relay device 30.

Note that the sequences in the diagrams in and after FIG. 5 show two ONUs 20 and one OLT 10 and one relay device 30.

Hence, in the sequences in the diagrams in and after FIG. 5, the "OLT 10" and the "relay device 30" are represented as "OLT" and "relay device", omitting reference signs in the drawings, and the ONUs 20 are represented as "ONU 1" and "ONU 2" to make a distinction therebetween.

As shown in FIG. 5, the OLT and the relay device periodically issue discovery GATEs to their downstream PONs. Here, it is assumed that a PON 2j under the control of the relay device does not have any ONU in operation.

When the ONU 1 that has newly started its operation receives the discovery GATE from the relay device, the ONU 1 sends back a REGISTER REQ during its transmission allowed period. When the relay device receives the REGISTER REQ from the ONU 1, the relay device sends back a REGISTER and sends a normal GATE to the ONU 1.

The ONU 1 sends back a REGISTER ACK during a period during which transmission is allowed by the normal GATE. When the relay device receives the REGISTER ACK from the ONU 1, the relay device completes the registration of the ONU 1.

When the relay device receives a discovery GATE from the OLT after the point in time when any of the ONUs under the control thereof has been registered, the relay device sends a REGISTER REQ back to the OLT during its transmission allowed period.

When the OLT receives the REGISTER REQ from the relay device, the OLT sends back a REGISTER and sends a normal GATE to the relay device.

The relay device sends back a REGISTER ACK during a period during which transmission is allowed by the normal GATE. When the OLT receives the REGISTER ACK from the relay device, the OLT completes the registration of the relay device.

As shown in the last half part of FIG. 5, when the ONU 2 newly starts its operation after the completion of the registration of the relay device in the above-described manner, the same sequence as that for the case of the ONU 1 is performed on the ONU 2, by which the ONU 2 is registered with the relay device.

Here, the registration sequence of the ONU 2 does not affect an MPCP link between the OLT and the relay device. In addition, user frames communicated by the ONU 1 and the ONU 2 with the OLT pass through the same logical link, between the OLT and the relay device.

When the relay device has completed the registration of the ONUs 1 and 2, the relay device establishes OAM links through logical links with the ONUs 1 and 2, and further performs OAM loopback tests.

Then, if the OAM loopback tests succeed, communication of user frames between the logical links and the upper-level PON is open.

In addition, when the OLT has completed the registration of the relay device, the OLT establishes an OAM link through a logical link with the relay device, and further performs an OAM loopback test.

Then, if the OAM loopback test succeeds, communication of user frames between the logical link and the upper network is open. Note that in the first embodiment those OAM loopback tests are independent of each other.

[Sequence of Upstream Multiple Access Control]

Figure 6:
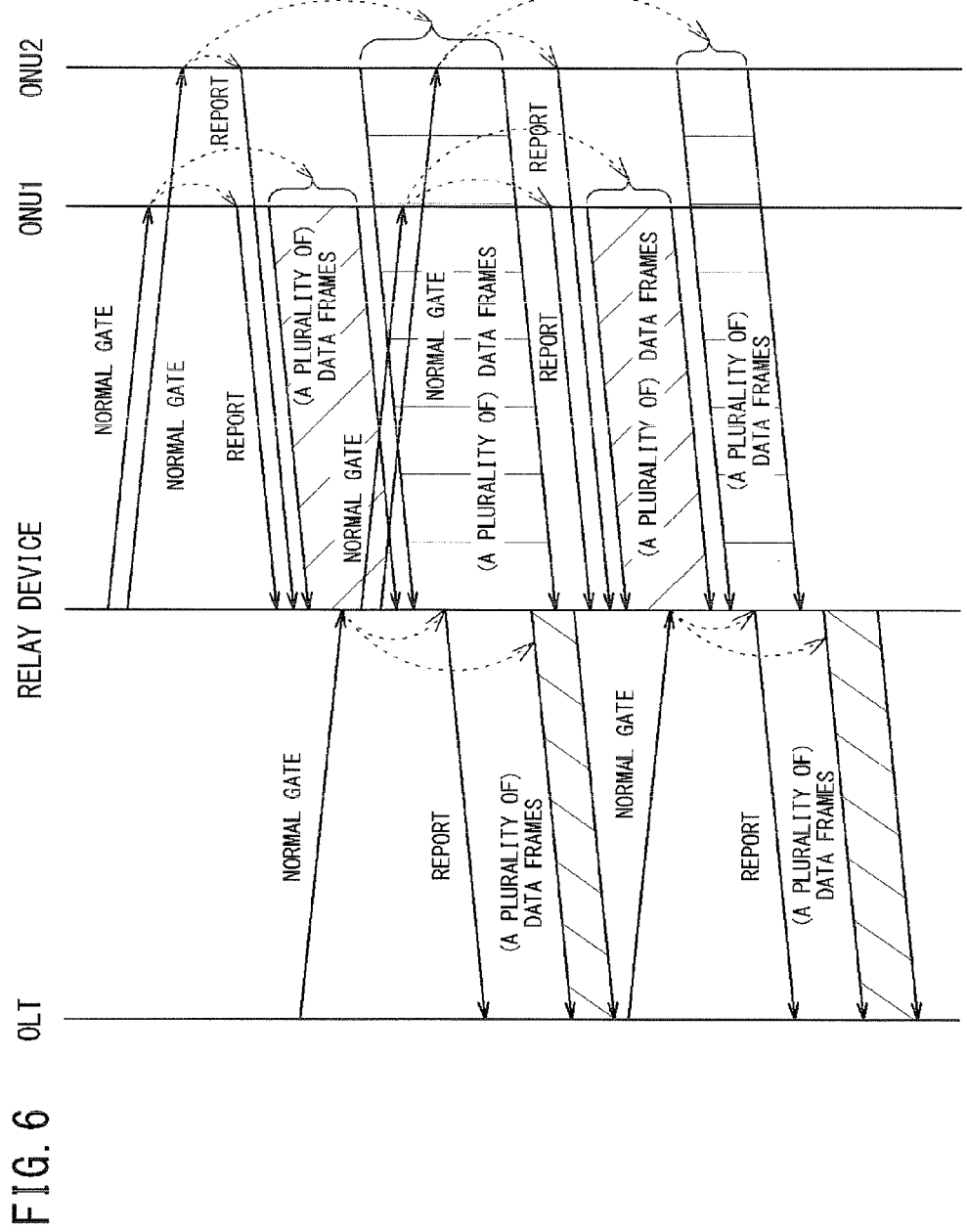
FIG. 6 is a diagram showing a sequence of upstream multiple access control.

FIG. 6 is a sequence diagram showing upstream multiple access control in the PON lines 1 and 2 in the optical communication system of the first embodiment.

More specifically, FIG. 6 shows multiple access control in the upstream direction which is performed after communication of user frames between the relay device and the ONU 1 and the ONU 2 has been open, and in which upstream burst signals are time-division multiplexed so as to prevent collisions of the signals in the each PON lines 1 and 2.

As shown in FIG. 6, the relay device schedules timing at which reception is performed thereby, such that bursts for reports and bursts for user frames from the ONUs 1 and 2 do not collide with each other, and notifies the ONUs 1 and 2 of the results thereof by normal GATE messages.

Each normal GATE message includes two grants. Of them, the first grant has a Force Report flag being enabled. The grant length of the second grant is determined using report messages received from the ONUs 1 and 2 for reference, or based on the policy of a network operator (telecommunication carrier).

Each of the ONUs 1 and 2 sends out a REPORT message or (a plurality of) data frames during a period indicated by the grant. Here, the data frames include a frame generated by the ONU 1, 2, such as an OAM message, and a user frame received from a lower network.

As shown in the left half part of FIG. 6, the OLT transmits a normal GATE message to the relay device under the control thereof, to independently perform upstream multiple access control for the upper-level PON.

Then, the relay device sends out upstream burst signals to the OLT, according to an instruction of the normal GATE from the OLT.

[Removal Sequence]

Figure 7:
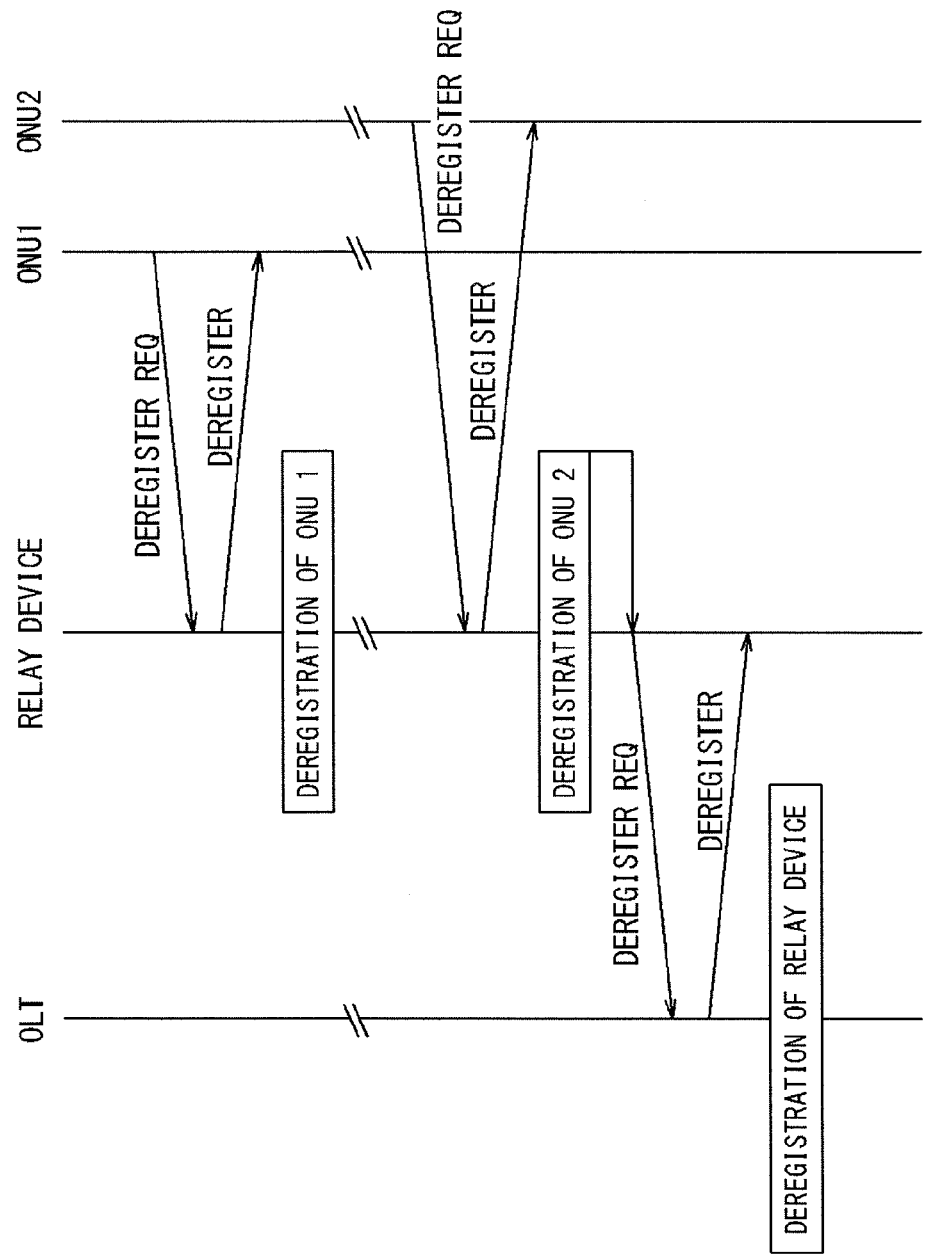
FIG. 7 is a diagram showing a removal sequence from the station side device.

FIG. 7 is a diagram showing a removal sequence of the ONUs 20 and the relay device 30 from the OLT 10 in the optical communication system of the first embodiment.

More specifically, FIG. 7 shows the association between MPCP messages exchanged between the relay device and the OLT to deregister the relay device from the OLT, and MPCP messages exchanged between the ONUs and the relay device to deregister the ONUs from the relay device.

Here, it is assumed that the PON under the control of the relay device does not have any ONU in operation other than the ONU 1 and the ONU 2.

The ONU 1 that newly stops its operation sends a DEREGISTER REQ to the relay device during a transmission allowed period indicated by a GATE message which is not shown in FIG. 7.

When the relay device receives the DEREGISTER REQ from the ONU 1, the relay device sends back a DEREGISTER and deregisters the ONU 1.

When the ONU 2 stops its operation thereafter, the same sequence as that for the case of the ONU 1 is performed, by which the relay device deregisters the ONU 2.

Here, since ONUs registered under the relay device are not present any more, the relay device sends a DEREGISTER REQ to the OLT during a transmission allowed period indicated by a GATE message which is not shown in FIG. 7. When the OLT receives the DEREGISTER REQ from the relay device, the OLT sends back a DEREGISTER and deregisters the relay device.

Effects of the First Embodiment

As described above, according to the relay device 30 of the first embodiment, the control unit 34 follows upstream multiple access control performed by the OLT 10, for transmission of upstream frames transmitted from the relay device 30, and independently performs upstream multiple access control for reception of upstream frames received by the relay device 30. Thus, a multi-level connection optical communication system such as that shown in FIG. 1 can be formed that includes an upper-level PON connecting a plurality of relay devices 30 with one OLT 10 at the top; and lower-level PONs each further connecting a plurality of ONUs 20 under the control of a corresponding relay device 30.

Hence, since the transmission distance unique to the PON has a value obtained by adding the transmission distance for the upper-level PON (PON 1) and the transmission distance for the lower-level PON (PON 2j), the distance between the OLT 10 and the ONUs 20 can be increased.

In addition, for the number of splits unique to the PON, since the number of splits for the upper-level PON and the number of splits for the lower-level PONs can be multiplied, the overall number of splits of the optical communication system can be increased.

In addition, even if the number of lower-level PONs is increased, one OLT 10 is sufficient and thus the overall cost of the optical communication system can be suppressed. In this case, since one interface of the OLT 10 with the upper network is sufficient, the overall cost of the optical communication system including the upper network can be suppressed.

Furthermore, since one relay device is sufficient per lower-level PON, in terms of this, too, the overall cost of the optical communication system can be suppressed.

Furthermore, the relay device 30 can sequentially perform, by the common control unit 34, control for performing communication by participating in the upper-level PON and control for performing communication by allowing the ONUs 20 to participate in the lower-level PON. Therefore, for example, one CPU for performing control is sufficient and thus the cost of the relay device 30 can be suppressed.

According to the relay device 30 of the first embodiment, the difference in transmission rate between the upper-level PON and the lower-level PON is absorbed by the upstream buffer 40 and the downstream buffer 41, by which the upper-level PON is made to be 10G-EPON and the lower-level PON is made to be 1G-EPON. Therefore, even when the number of splits n of the upper-level PON is increased, bandwidth per user can be secured.

In addition, according to the relay device 30 of the first embodiment, there is a one-to-many correspondence between the logical link in the upper-level PON used for upstream multiple access control performed by the OLT 10 and the logical links in the lower-level PON used for upstream multiple access control performed by the control unit 34. Therefore, the number of logical links in the upper-level PON depends on the number of the relay devices 30 but not on the number of the ONUs 20.

Hence, even if the number of ONUs 20 under the control of the relay device 30 is increased, burst overhead and the overhead of control messages do not change, enabling to prevent an unwanted reduction in bandwidth per user.

Furthermore, according to the relay device 30 of the first embodiment, the control unit 34 requests the OLT 10 to establish a logical link in the upper-level PON after establishing a logical link in the lower-level PON. Thus, when there are no ONUs 20 in operation under the relay device 30, the relay device 30 is not registered with the OLT 10.

Hence, wasteful control messages are not generated between the relay device 30 having no ONUs 20 registered therewith and the OLT 10, enabling to prevent an unwanted reduction in user bandwidth in the upper-level PON.

Note that although in the above-described first embodiment each of the OLT 10, the ONUs 20, and the relay devices 30 is provided with one upstream queue (buffer) for user frames and one downstream queue (buffer) for user frames, a plurality of those queues may be provided according to priority levels or QoS classes.

Note also that although in the above-described first embodiment MAC addresses and LLIDs are associated with each other using the LLID resolution tables 14 and 36 of the OLT 10 and the relay device 30, for example, the VLAN tag values (VIDs) and LLIDs of user frames may be associated with each other. In this case, it is ideal to provide registration of table elements by a network administrator or a management apparatus, instead of on a learning basis.

Second Embodiment

[Device configuration, etc., of the second embodiment]

The configurations of an optical communication system, an OLT 10, and ONUs 20 according to a second embodiment of the present invention are the same as those in the case of the first embodiment (see FIGS. 1 to 3).

Meanwhile, a relay device 30 used in the second embodiment acts as a plurality of "logical ONUs" with respect to an upper-level PON 1. The logical ONUs are provided so as to have a one-to-one correspondence with ONUs 20 in a lower-level PON 2j (j=1, 2 . . . n).

The basic components of the relay device 30 are the same as those in the case of the first embodiment (FIG. 4). However, in the second embodiment, a second upstream buffer 40 for upstream user frames is provided for each logical ONU in the upper-level PON.

Upon relaying an upstream user frame, the relay device 30 of the second embodiment uniquely determines an LLID to be used in the PON 1 which is a relay destination, from an LLID used in the PON 2j which is a relay source. In addition, in the second embodiment, a buffer for a loop 42 in FIG. 4 is not necessary, the reason for which will be described later in description of FIG. 11.

[Registration Sequence]

Figure 8:
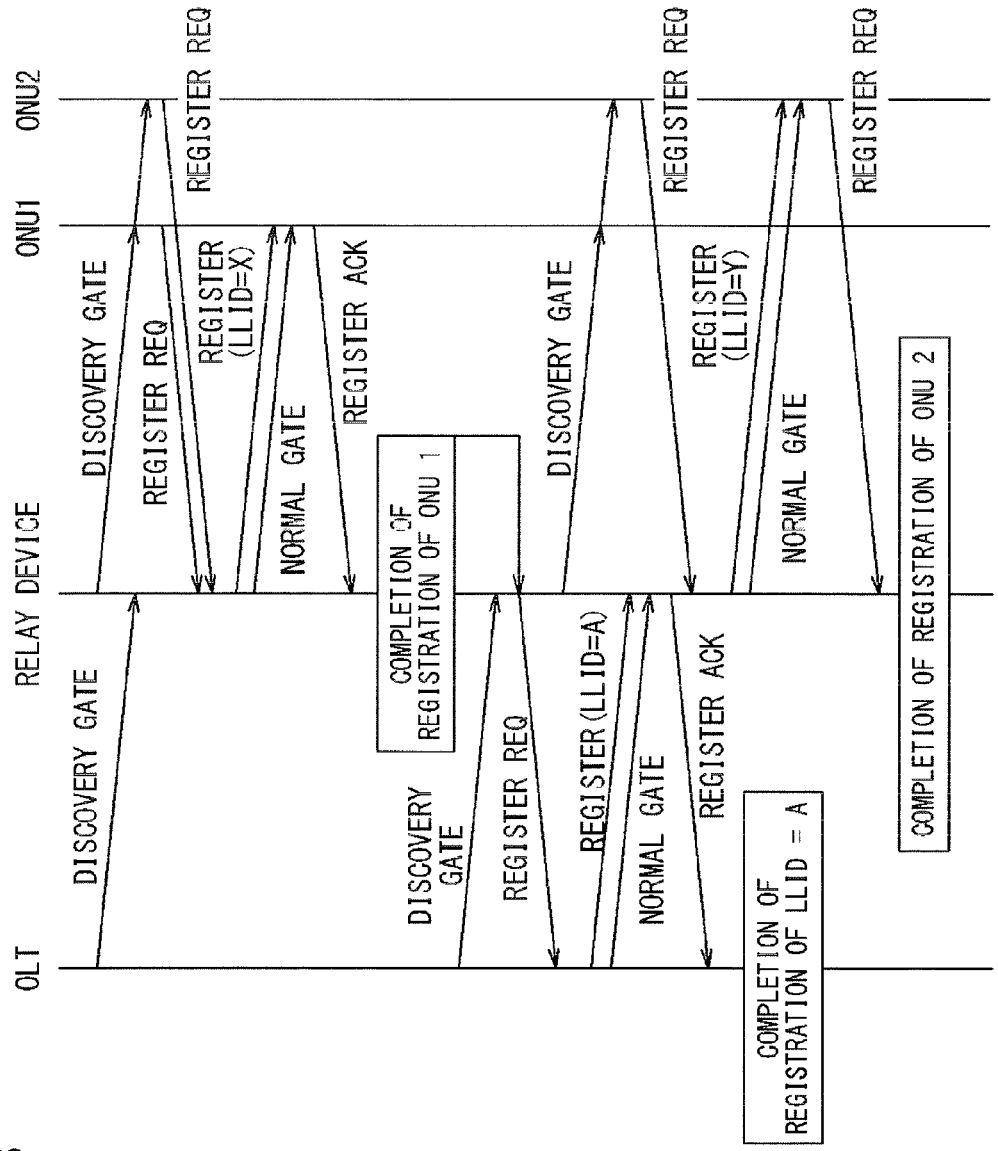
FIG. 8 is a diagram showing a registration sequence with the station side device in the case of a second embodiment.
Figure 9:
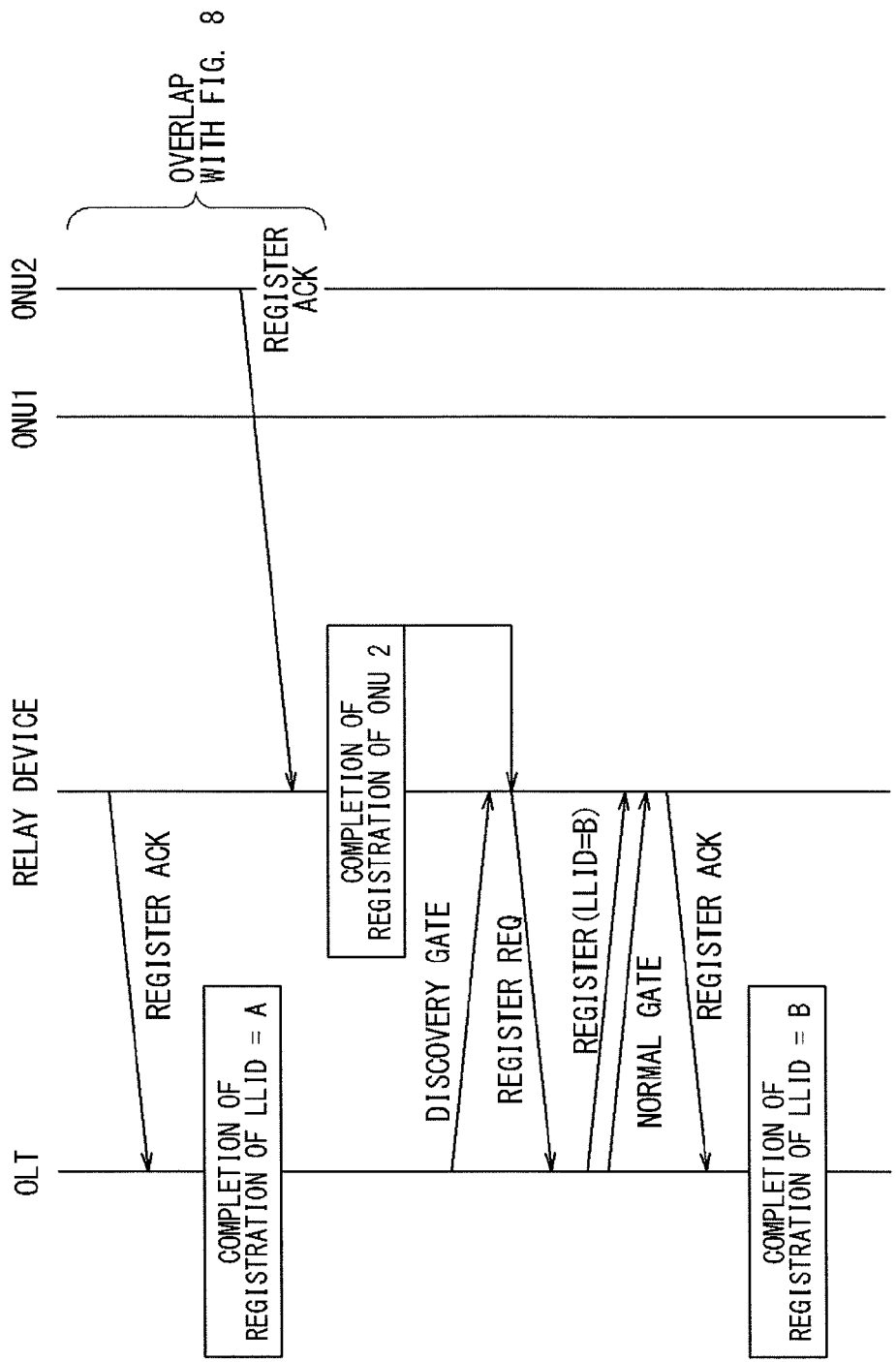
FIG. 9 is a diagram showing a sequence continued from FIG. 8.

FIGS. 8 and 9 are diagrams showing a registration sequence of ONUs and logical ONUs in a relay device in the optical communication system of the second embodiment. Note that FIG. 9 is a diagram continued from FIG. 8.

More specifically, FIGS. 8 and 9 show the association between MPCP messages exchanged between the logical ONUs in the relay device and the OLT to register the logical ONUs with the OLT, and MPCP messages exchanged between the ONUs and the relay device to register the ONUs with the relay device.

As shown in FIG. 8, the OLT and the relay device periodically issue discovery GATEs to their downstream PONs.

When an ONU 1 that has newly started its operation receives the discovery GATE from the relay device, the ONU 1 sends back a REGISTER REQ during its transmission allowed period. When the relay device receives the REGISTER REQ from the ONU 1, the relay device sends back a REGISTER (an LLID set here is "X") and sends a normal GATE to the ONU 1.

The ONU 1 sends back a REGISTER ACK during a period during which transmission is allowed by the normal GATE. When the relay device receives the REGISTER ACK from the ONU 1, the relay device completes the registration of the ONU 1.

When the relay device receives a discovery GATE from the OLT after the completion of the registration of the ONU 1, the relay device sends back a REGISTER REQ during its transmission allowed period.

At this time, the source MAC address of the REGISTER REQ is changed on a per ONU in the lower-level PON basis, so as to allow the OLT to recognize it as a new "logical ONU".

Specifically, when the OLT receives the REGISTER REQ from the relay device, the OLT sends back a REGISTER (LLID=A) and sends a normal GATE to the relay device. The relay device sends back a REGISTER ACK during a period during which transmission is allowed by the normal GATE.

The relay device stores the association between the LLID (=X) between the relay device and the ONU 1 in the lower-level PON and the LLID (=A) in the upper-level PON, in the aforementioned LLID resolution table 36 (see FIG. 4).

Note that in the case of the second embodiment since, as described above, logical links of the upper and lower levels are allowed to have a one-to-one correspondence upon discovery, there is no need for a second reception processing unit 35 of the relay device (see FIG. 4) to learn the association between the source MAC address and LLID of a received user frame, and record the association in the resolution table 36, like the case of the first embodiment.

In addition, a second transmission processing unit 37 of the relay device determines an LLID of a user frame by referring to the resolution table 36 on the basis of the LLID used in the PON line 1.

When the OLT receives the REGISTER ACK from the relay device, the OLT completes the registration of the logical ONU (LLID=A) for the ONU 1.

When an ONU 2 newly starts its operation thereafter, the same sequence as that for the case of the ONU 1 is performed, by which the ONU 2 with LLID=Y is registered with the relay device.

Furthermore, as shown in FIG. 9, in the upper-level PON 1, too, the same sequence as that for the case of the ONU 1 is performed, by which a new logical ONU (LLID=B) for the ONU 2 is registered with the OLT. At this time, the relay device stores a one-to-one correspondence relationship between the LLIDs in the upper-level PON 1 and the lower-level PON 2j in the resolution table 36.

When the relay device has completed the registration of the ONUs 1 and 2 under the control thereof, the relay device establishes OAM links through logical links with the ONUs 1 and 2.

Note, however, that in the second embodiment the relay device does not perform OAM loopback tests on the ONUs 1 and 2 because the OLT performs the tests. In addition, when the OLT has completed the registration of the logical ONUs in the relay device, the OLT establishes OAM links through logical links with the logical ONUs in the relay device. An OAM loopback test performed by the OLT in the second embodiment will be described in FIG. 11.

[Removal Sequence]

Figure 10:
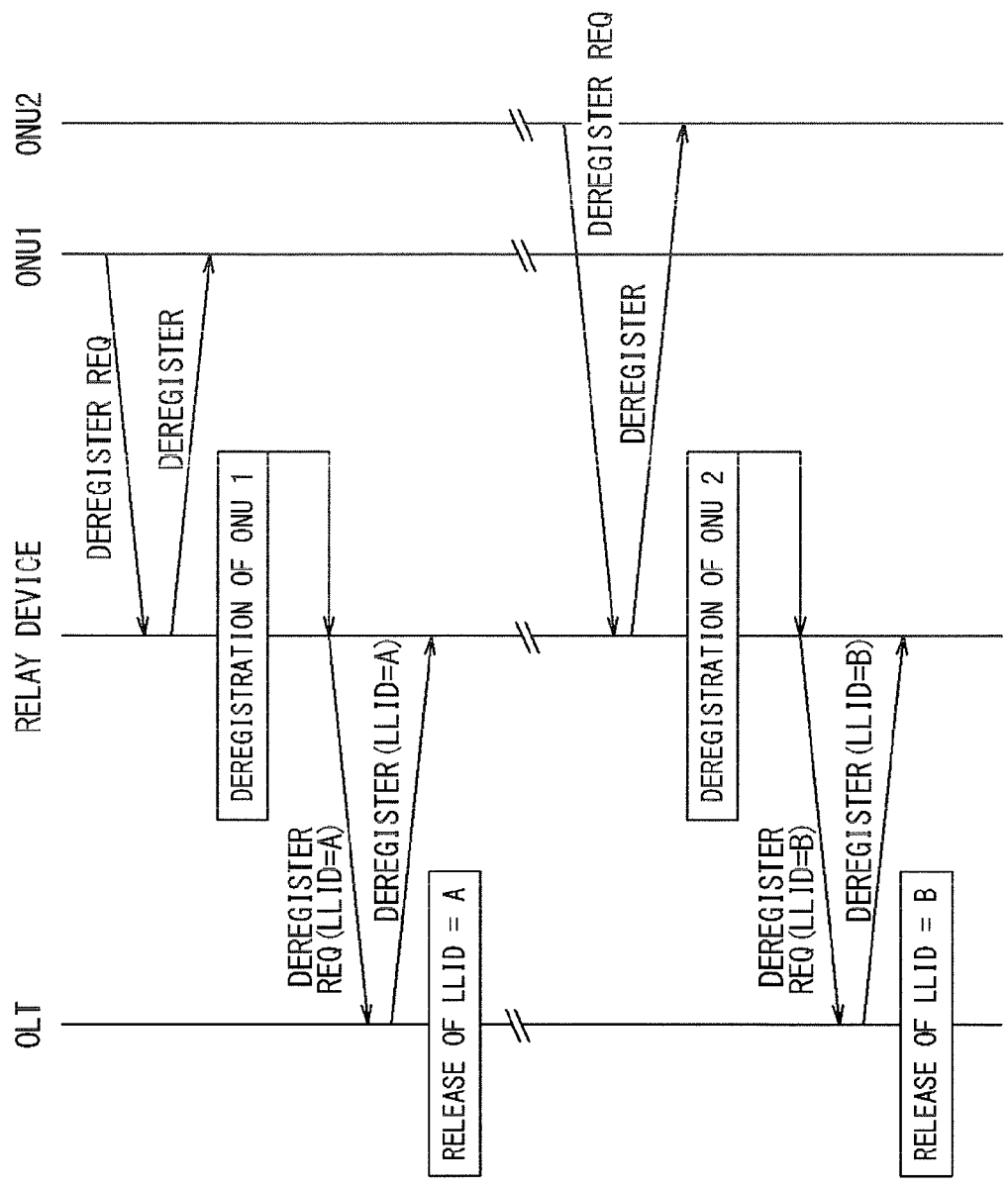
FIG. 10 is a diagram showing a removal sequence from the station side device in the case of the second embodiment.

FIG. 10 is a diagram showing a removal sequence of the ONUs and the logical ONUs in the relay device in the optical communication system of the second embodiment.

More specifically, FIG. 10 shows the association between MPCP messages exchanged between the logical ONUs in the relay device and the OLT to deregister the logical ONUs from the OLT, and MPCP messages exchanged between the ONUs and the relay device to deregister the ONUs from the relay device.

As shown in FIG. 10, the ONU 1 that newly stops its operation sends a DEREGISTER REQ to the relay device during a transmission allowed period indicated by a GATE message which is not shown in FIG. 10.

When the relay device receives the DEREGISTER REQ from the ONU 1, the relay device sends back a DEREGISTER and deregisters the ONU 1.

Then, the relay device sends a DEREGISTER REQ to the OLT through a logical link with LLID=A during a transmission allowed period indicated by a GATE message which is not shown in FIG. 10.

When the OLT receives the DEREGISTER REQ from the logical link with LLID=A, the OLT sends back a corresponding DEREGISTER and deregisters the logical ONU with LLID=A.

When the ONU 2 stops its operation thereafter, too, the same sequence as that for the case of ONU 1 is performed, by which the relay device deregisters the ONU 2.

Furthermore, in the upper-level PON 1, too, the same sequence is performed, by which the OLT deregisters a logical ONU with LLID=B.

[Sequence of a Loopback Test]

Figure 11:
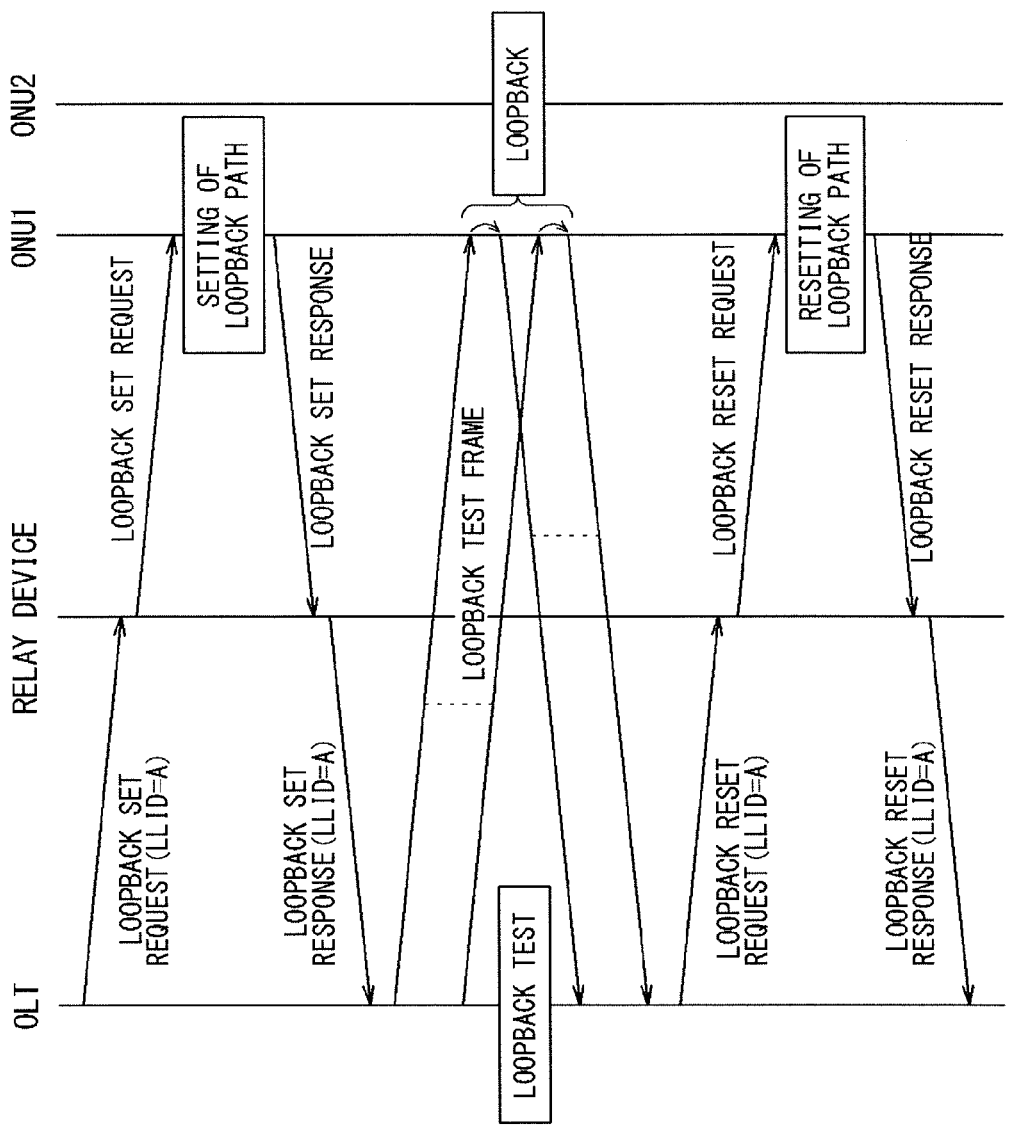
FIG. 11 is a diagram showing a sequence of an OAM loopback test in the case of the second embodiment.

FIG. 11 is a diagram showing an OAM loopback test sequence in the optical communication system of the second embodiment.

More specifically, FIG. 11 shows the association between an OAM loopback test in the upper-level PON and an OAM loopback test in the lower-level PON.

It is assumed that at the start of a sequence in FIG. 11 a logical link with LLID=A and an OAM link thereabove are being established by the OLT.

In this case, the OLT sends a loopback control OAM message requesting to set OAM loopback (hereinafter, referred to as a "loopback set request") to the LLID=A.

When the relay device 1 receives the message from the upper-level PON, the relay device sends a loopback set request to the ONU 1 in the lower-level PON.

When the ONU 1 receives the message from the lower-level PON, the ONU 1 sets an "OAM loopback path" which goes through a buffer for a loop 29, and sends a loopback control OAM message notifying of the setting of the OAM loopback path (hereinafter, referred to as a "loopback set response") back to the relay device.

When the relay device receives the message from the lower-level PON, the relay device sends a loopback set response back to the OLT in the upper-level PON, and opens communication of user frames between the logical link with LLID=A in the upper-level PON and a logical link with LLID=X in the lower-level PON.

When the OLT receives the message, the OLT performs an OAM loopback test on the logical link with LLID=A.

Specifically, a control unit 12 of the OLT notifies a reception processing unit 13 of the fact that LLID=A is in an OAM loopback test state, and then sends an OAM loopback test frame (LLID=A) to a transmission processing unit 15. Then, the control unit 12 of the OLT checks the OAM loopback test frame returned via the reception processing unit 13 to determine whether the test passes or fails.

After the completion of the test, the OLT sends a loopback control OAM message requesting to reset the OAM loopback (hereinafter, a "loopback reset request") to the LLID=A. When the relay device receives the message from the upper-level PON, the relay device sends a loopback reset request to the LLID=X in the lower-level PON.

When the ONU 1 receives the message from the lower-level PON, the ONU 1 resets the OAM loopback path which goes through the buffer for a loop 29, and sends back a loopback control OAM message notifying of the resetting of the OAM loopback path (hereinafter, a "loopback reset response").

When the relay device receives the message from the lower-level PON, the relay device sends a loopback reset response back to the OLT in the upper-level PON.

When the control unit 12 of the OLT receives the message, the control unit 12 notifies the reception processing unit 13 of the resetting of the OAM loopback test state of the LLID=A, and opens communication of user frames between the LLID=A and an upper network.

Effects of the Second Embodiment

According to the relay device 30 of the second embodiment, the following effects are further provided compared to the case of the first embodiment.

Specifically, in the second embodiment, every time the relay device 30 establishes a logical link of the PON line 2, the relay device 30 requests the OLT 10 to establish a logical link of the PON line 1 (the registration sequence in FIGS. 8 and 9). Every time the relay device 30 disconnects the logical link of the PON line 2, the relay device 30 requests the OLT 10 to establish disconnect the logical link of the PON line 1 (the removal sequence in FIG. 10).

Hence, the OLT 10 can manage logical links having a one-to-one correspondence with the ONUs 20, enabling to implement fine-grained QoS control on a per ONU 20 basis and better fairness among the ONUs 20, compared to the case of the first embodiment.

In addition, according to the relay device 30 of the second embodiment, as described above, an OAM loopback test where the upper-level PON and the lower-level PON are linked to each other can be performed (the sequence of an OAM loopback test in FIG. 11). Therefore, trouble related to the upstream buffer 40 or the downstream buffer 41 of the relay device 30 can be detected, enabling to further improve the maintainability of the optical communication system.

<Other Variants>

The scope of the present invention is indicated by the claims rather than by the above-described embodiments (including the variants), and all changes that come within the range of equivalency of the claims and the configurations thereof are to be embraced therein.

In the above-described embodiments, the upper-level PON (PON 1) is symmetric 10G-EPON where both of the upstream and downstream transmission rates are 10G, and the lower-level PON is G-EPON. However, the upper-level PON (PON 1) may be symmetric 10G-EPON, and the lower-level PON may be asymmetric 10G-EPON where the downstream transmission rate is 10G and the upstream transmission rate is 1G (variant 1). Alternatively, the upper-level PON (PON 1) may be asymmetric 10G-EPON, and the lower-level PON may be G-EPON (variant 2).

For example, in the case of the above-described variant 1, the difference in upstream transmission rate between the first PON transmitting and receiving unit 31 and the second PON transmitting and receiving unit 38 may be absorbed by the upstream buffer 40 of the relay device 30.

In the case of the above-described variant 2, the difference in downstream transmission rate between the first PON transmitting and receiving unit 31 and the second PON transmitting and receiving unit 38 may be absorbed by the downstream buffer 41 of the relay device 30.

In the above-described embodiments, one ONU 20 is associated with one logical link in a lower-level PON. It is premised that even when a plurality of service classes are assumed, a plurality of queues associated with the service classes are formed in one logical link. However, a plurality of logical links associated with the service classes may be formed for one ONU 20.

In such a case in which a plurality of logical links are assumed for one ONU 20, in the above-described first embodiment, for logical links belonging to the same service class, a logical link of the PON line 1 and the logical links of a PON line 2 may be allowed to have a one-to-many correspondence.

Likewise, in the above-described second embodiment, for logical links belonging to the same service class, a logical link of the PON line 1 and the logical links of a PON line 2 may be allowed to have a one-to-one correspondence.

In addition, the relay device 30 of the above-described embodiments may be provided with another path that demultiplexes a specific wavelength in the upper-level PON (PON 1) in the device and multiplexes an optical signal as it is in the lower-level PON. At this time, optical power may be amplified by an optical amplifier, etc. The specific wavelength can be used for an OTDR test, video signal broadcasting, etc.

In addition, although in the above-described embodiments the lower-level PON is G-EPON, the lower-level PON may adopt dual-rate PON which uses both G-EPON and 10G-EPON. In this case, since a G-EPON ONU 20 and a 10G-EPON ONU 20 coexist in the same lower-level PON, the relay device 30 determines a use rate according to the type of a registered ONU 20.

Furthermore, as the upper-level PON, in addition to transmitting and receiving means of 10G-EPON, transmitting and receiving means of G-EPON may be provided to the relay device 30, or the transmitting and receiving means of the 10G-EPON may also have the transmission and reception functions of the G-EPON, and one of them may be allowed to operate by setting.

In conjunction with the dual-rate support for the lower-level PON, the relay device 30 turns out to operate as a relay device of G-EPON or as a relay device of 10G-EPON in addition to the operation of the present invention. Thus, the application range of the relay device extends.

In addition, in the above-described embodiments, in the relay device 30, one control unit 34 performs a control frame process for the upper-level PON (PON 1) and a control frame process for the lower-level PON.

Furthermore, the above-described embodiments show an example in which regarding registration, removal, and an OAM loopback test, control messages for the upper-level PON (PON 1) and the lower-level PON are associated with each other. However, in addition thereto, control messages may be associated in the "sleep control", "notification and update of an encryption key", "ONU management", etc., of ONUs 20.

For example, in the case of performing sleep control in the above-described first embodiment, when a relay device 30 receives a sleep instruction from the OLT 10, the relay device 30 transmits a sleep instruction to ONUs 20 under the control thereof, on condition that there is no transmit data. Then, when the relay device 30 obtains sleep responses of Ack from all ONUs 20, the relay device 30 sends a sleep response thereof back to the OLT 10.

In this case, the transmission operation of the ONUs 20 to their lower-level PONs can be put to sleep, enabling to achieve the power savings of the ONUs 20. Furthermore, when all ONUs 20 go to sleep, the transmission operation of the relay device 30 to the upper-level PON can be put to sleep, enabling to achieve the power savings of the relay device 30.

In addition, in the case of performing sleep control in the above-described second embodiment, a relay device 30 relays a sleep instruction from the OLT 10 to a corresponding logical link, and reports a sleep response acknowledge/unacknowledge result from an ONU 20 directly to the OLT 10. The relay device 30 performs its sleep operation during the overlapping sleep times of ONUs 20 under the control thereof.

In this case, not only the transmission operation of the ONUs 20 to their lower-level PONs, but also the reception operation of the ONUs 20 from their lower-level PONs can be put to sleep, enabling to further improve the power-saving effect of the ONUs 20. Furthermore, during the period during which the sleeps of all ONUs 20 overlap one another, not only the transmission operation of the relay device 30 to the upper-level PON, but also the reception operation of the relay device 30 from the upper-level PON can be put to sleep, enabling to further improve the power-saving effect of the relay device 30.

In addition, in the above-described embodiments, the relay device 30 may include a plurality of lower-level PONs. In this case, the LLID resolution table 36 resolves a lower-level PON and LLIDs in that PON as a unit.

Third Embodiment

[Device configuration, etc., of the third embodiment]

The configurations of an optical communication system, an OLT 10, ONUs 20, and relay devices 30 according to a third embodiment of the present invention are the same as those in the case of the first embodiment (see FIGS. 1 to 4).

In addition, a registration sequence, a multiple access sequence, and a removal sequence are the same as those in the case of the first embodiment (see FIGS. 5 and 6).

However, in the third embodiment, a PON transmitting and receiving unit 21 of an ONU 20 (see FIG. 3) has a "sleep function" that stops an upstream transmission function. If a sleep signal inputted from a control unit 24 is enabled, the PON transmitting and receiving unit 21 stops a transmission function by turning off the power to its laser diode and transmitter circuit, thereby reducing power consumption.

Likewise, a transmission processing unit 22 of the ONU 20 (see FIG. 3) also has a "sleep function". If a sleep signal inputted from the control unit 24 is enabled, the transmission processing unit 22 stops its process, thereby reducing power consumption.

In addition, in the third embodiment, a first PON transmitting and receiving unit 31 and a first transmission processing unit 32 of a relay device 30 (see FIG. 4) also have the same "sleep functions" as those of the PON transmitting and receiving unit 21 and the transmission processing unit 22 of the ONU 20.

As such, in the third embodiment, the ONU 20 and the relay device 30 have the sleep functions that stop only the upstream transmission functions for a predetermined period of time.

[Sleep Control Performed by the OLT and the ONUs]

The OLT 10 and the ONUs 20 of the third embodiment can perform the following "sleep control". The sleep control is the same as that in the case of a normal PON where a relay device 30 is not intervened.

A control unit 12 of the OLT 10 refers to a report message received from an ONU 20, and when there is no bandwidth request after a lapse of a predetermined period or when, even if there is a bandwidth request, the bandwidth is less than or equal to a predetermined level, the control unit 12 transmits a "sleep instruction" to the ONU 20, as a kind of control frame.

When the control unit 24 of the ONU 20 receives the sleep instruction from the OLT 10, the control unit 24 checks whether there is data to be transmitted to the OLT 10 in light of a predetermined level. If there is data, the control unit 24 sends back "Nack" as a "sleep response" which is a kind of control frame.

If there is no data, the control unit 24 of the ONU 20 sends back "Ack" and enables a transmit sleep signal only for a predetermined sleep period.

When the control unit 12 of the OLT 10 receives the sleep response from the ONU 20, if the response is Nack, the control unit 12 continues normal operation.

If the sleep response is Ack, the control unit 12 of the OLT 10 stops transmission of a normal GATE to the ONU 20 only for a predetermined sleep period. During this sleep period, the control unit 12 maintains an MPCP link and an OAM link even if not receiving a report message or an OAM message.

Then, when the sleep period (which is set by, for example, a sleep instruction, etc.) ends, the control unit 12 of the OLT 10 resumes normal operation.

Note that the sleep operation in the third embodiment is, as described above, limited to upstream transmission. Hence, user frames in the downstream direction are communicated as usual.

[Sleep Control in the Case of a Relay Device Present]

Figure 12:
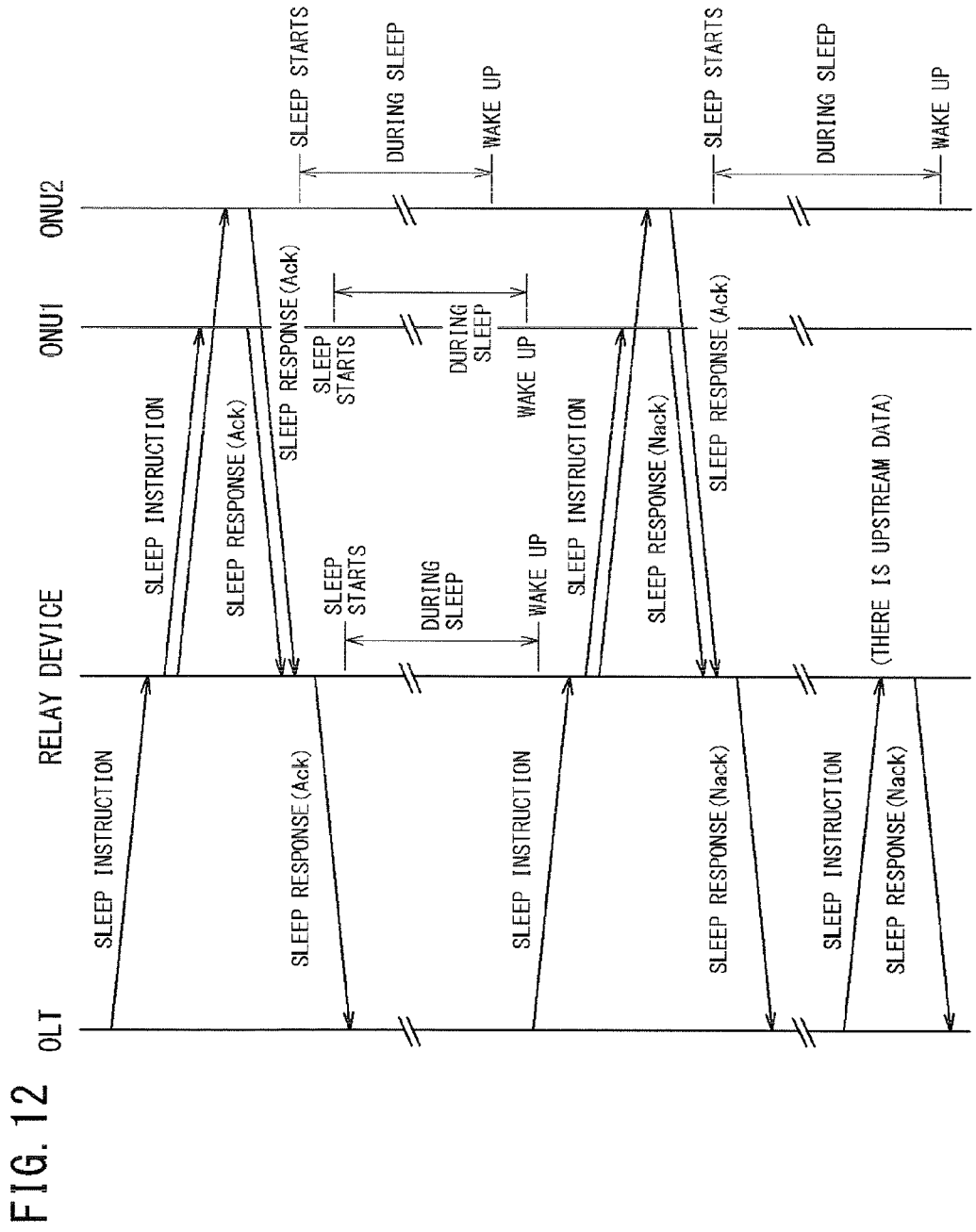
FIG. 12 is a diagram showing a sleep control sequence in an optical communication system of a third embodiment including a relay device.

FIG. 12 is a diagram showing a sleep control sequence in the optical communication system of the third embodiment including a relay device 30.

More specifically, FIG. 12 shows the association between sleep instruction and sleep response messages exchanged in the upper-level PON and sleep instruction and sleep response messages exchanged in the lower-level PON.

In the sleep control sequence in FIG. 12, sleep operations performed by the OLT 10 and ONUs 20 are, as described above, the same as those in the case of a normal PON.

As shown in FIG. 12, when a control unit 34 of a relay device receives a sleep instruction from the OLT, the control unit 34 checks whether there is data to be transmitted to the OLT in light of a predetermined level. If the relay device has upstream data, the control unit 34 sends Nack back to the OLT to continue normal operation (see "sleep response (Nack)" at the bottom of the left half part of FIG. 12).

Alternatively, if the relay device does not have upstream data when a sleep instruction is received from the OLT, the control unit 34 of the relay device sends a sleep instruction to all ONUs under the control thereof (ONU 1 and ONU 2 in the example in the drawing) (see each "sleep instruction" in the right half part of FIG. 12).

If, of the ONUs under the control of the relay device, there is even one ONU 1 or 2 that sends back a sleep response of Nack, the control unit 34 of the relay device sends a sleep response of Nack back to the OLT (see the second "sleep response (Nack)" from the top of the left half part of FIG. 12).

Namely, only when the sleep responses from all of the ONUs 1 and 2 under the lower-level PON are Ack, the control unit 34 of the relay device sends a sleep response of Ack back to the OLT (see the first "sleep response (Ack)" in the left half part of FIG. 12).

In this case, the control unit 34 of the relay device also enables a sleep signal for the relay device only for a predetermined sleep period to put the upstream transmission function to sleep. By this, transmission of normal GATEs to the ONUs 1 and 2 whose sleep responses are Ack is stopped only for a predetermined sleep period.

Note that during the sleep periods of the ONUs 1 and 2 whose sleep responses are Ack, even if the control unit 34 of the relay device does not receive report messages or OAM messages from the ONUs 1 and 2, the control unit 34 maintains MPCP links and OAM links with the ONUs 1 and 2.

Here, the sleep period of each of the relay device and the ONUs 1 and 2 may be provided by a parameter described in a sleep instruction or may be separately set in an OAM message, etc.

In addition, the sleep periods of the relay device and the ONUs 1 and 2 may have the same value or may have different values. For example, taking into account RTT (Round Trip Time) between the relay device and each of the ONUs 1 and 2, the sleep period of each of the ONUs 1 and 2 may be set to be longer by an amount corresponding to the RTT than the sleep period of the relay device.

Effects of the Third Embodiment

According to the relay device 30 of the third embodiment, the following effects are further provided compared to the case of the first embodiment.

Note that in the following a sleep instruction transmitted in the downstream direction by the OLT 10 to the upper-level PON may be referred to as a "first sleep instruction", and a sleep instruction transmitted in the downstream direction by the relay device 30 to the lower-level PON may be referred to as a "second sleep instruction". In addition, a sleep response transmitted in the upstream direction by the ONU 20 to the lower-level PON may be referred to as a "second sleep response", and a sleep response transmitted in the upstream direction by the relay device 30 to the upper-level PON may be referred to as a "first sleep response".

In the relay device 30 of the third embodiment, the control unit 34 generates second sleep instructions to be transmitted to ONUs 20, from one first sleep instruction obtained from the OLT 10, according to the correspondence relationship between the PON lines 1 and 2 (in the third embodiment, logical links have a one-to-many correspondence).

Therefore, one first sleep instruction in the upper-level PON is converted by the relay device 30 to one or a plurality of second sleep instructions in the lower-level PON, and the second sleep instructions are transmitted to the ONUs 20, respectively, in a multicast fashion.

Hence, the OLT 10 in the upper-level PON can intensively control the sleep operation of the ONUs 20 in the lower-level PON for upstream transmission. This prevents the occurrence of an event where the relay device 30 puts upstream transmission to sleep just when an ONU 20 wakes up, enabling to prevent a delay in the resumption of upstream traffic.

In addition, according to the relay device 30 of the third embodiment, the control unit 34 performs the sleep operation of the relay device 30 in which, when second sleep responses transmitted from the ONUs 20 are all "Ack", the control unit 34 transmits a first sleep response of Ack to the OLT 10, and suspends the transmission function of at least one of the first PON transmitting and receiving unit 31 and the first transmission processing unit 32.

Therefore, the upstream transmission of the relay device 30 can be put to sleep on condition that all of the ONUs 20 under the control of the relay device 30 put their upstream transmission to sleep, enabling to achieve the power savings of the relay device 30.

Fourth Embodiment

[Device configuration, etc., of the fourth embodiment]

An optical communication system, an OLT 10, ONUs 20, and relay devices 30 according to a fourth embodiment of the present invention are basically the same as those of the second embodiment.

Specifically, in the fourth embodiment, too, although the configurations of the optical communication system, the OLT 10, and the ONUs 20 are the same as those in the case of the first embodiment (see FIGS. 1 to 3), each of the relay devices 30 acts as a plurality of "logical ONUs" with respect to an upper-level PON 1. The logical ONUs are provided so as to have a one-to-one correspondence with ONUs 20 in a lower-level PON 2j (j=1, 2 . . . n).

In addition, in the fourth embodiment, an upper network operates such that a VLAN (Virtual LAN) tag for identifying an ONU 10 is added to a frame. A downstream buffer 18 of the OLT 10 shown in FIG. 2 is formed for each VLAN. The downstream buffers 18 of the OLT 10 formed for each VLAN are hereinafter referred to as a "FIFO group 18".

A transmission processing unit 15 of the OLT 10 extracts frames from FIFOs that are not empty among the FIFO group 18, in a round-robin fashion.

In addition, the transmission processing unit 15 and a reception processing unit 13 of the OLT 10 resolve the association between a VLANID (VLAN identifier) and an LLID by referring to an LLID resolution table table 14. The reception processing unit 13 adds or overwrites the resolved VLANID to/in a receive frame and sends the frame to an upstream buffer 17.

Furthermore, in a downstream buffer 41 of a relay device 30 shown in FIG. 4, the amount of data saved is counted on a per logical link basis.

In the fourth embodiment, a PON transmitting and receiving unit 21 of an ONU 20 (see FIG. 3) has a "sleep function" that stops both of the transmission and reception functions. If a sleep signal inputted from a control unit 24 is enabled, the PON transmitting and receiving unit 21 stops both of the transmission and reception functions by turning off the power to its laser diode and transmitter circuit and photodiode and receiver circuit, thereby reducing power consumption.

Likewise, each of a transmission processing unit 22 and a reception processing unit 23 of the ONU 20 (see FIG. 3) also has a "sleep function". If a sleep signal inputted from the control unit 24 is enabled, the processing units 22 and 23 stop their processes, thereby reducing power consumption.

In addition, in the fourth embodiment, a first PON transmitting and receiving unit 31, a first transmission processing unit 32, and a first reception processing unit 33 of a relay device 30 (see FIG. 4) also have the same "sleep functions" as those of the PON transmitting and receiving unit 21, the transmission processing unit 22, and the reception processing unit 23 of the ONU 20.

As such, in the fourth embodiment, the ONU 20 and the relay device 30 have the sleep functions that stop both of the upstream transmission function and the downstream reception function only for a predetermined period of time.

[Sleep Control Performed by the OLT and the ONUs]

The OLT 10 and the ONUs 20 of the fourth embodiment can perform the following "sleep control". The sleep control is the same as that in the case of a conventional PON where a relay device 30 is not intervened.

A control unit 12 of the OLT 10 checks logical links with ONUs 20 in turn. When there is no bandwidth request only for a predetermined period or when, even if there is a bandwidth request, the bandwidth is less than or equal to a predetermined level and a FIFO associated with the logical link among the FIFO group 18 is empty or is less than or equal to a predetermined level, the control unit 12 instructs the transmission processing unit 15 to inhibit the scheduling of the FIFO, and transmits a "sleep instruction" to the logical link, as a kind of control frame.

When the control unit 24 of the ONU 20 receives the sleep instruction from the OLT 10, the control unit 24 checks whether there is data to be transmitted to the OLT 10 in light of a predetermined level. If there is data, the control unit 24 sends back "Nack" as a "sleep response" which is a kind of control frame.

If there is no data, the control unit 24 of the ONU 20 sends back "Ack" and enables a sleep signal only for a predetermined sleep period.

When the control unit 12 of the OLT 10 receives the sleep response from the ONU 20, if the response is Nack, the control unit 12 instructs the transmission processing unit 15 to resume the scheduling of the FIFO, and continues normal operation.

If the sleep response is Ack, the control unit 12 of the OLT 10 stops transmission of a normal GATE to the ONU 20 only for a predetermined sleep period. During this sleep period, the control unit 12 maintains an MPCP link and an OAM link even if not receiving a report message or an OAM message.

Then, when the sleep period (which is set by, for example, a sleep instruction, etc.) ends, the control unit 12 of the OLT 10 instructs the transmission processing unit 15 to resume the scheduling of the FIFO, and resumes normal operation.

Note that the sleep operation in the fourth embodiment is, as described above, applied not only to upstream transmission but also to downstream reception, which is the difference from the case of the above-described third embodiment where sleep operation is limited to upstream transmission.

[Sleep Control in the Case of a Relay Device Present]

Figure 13:
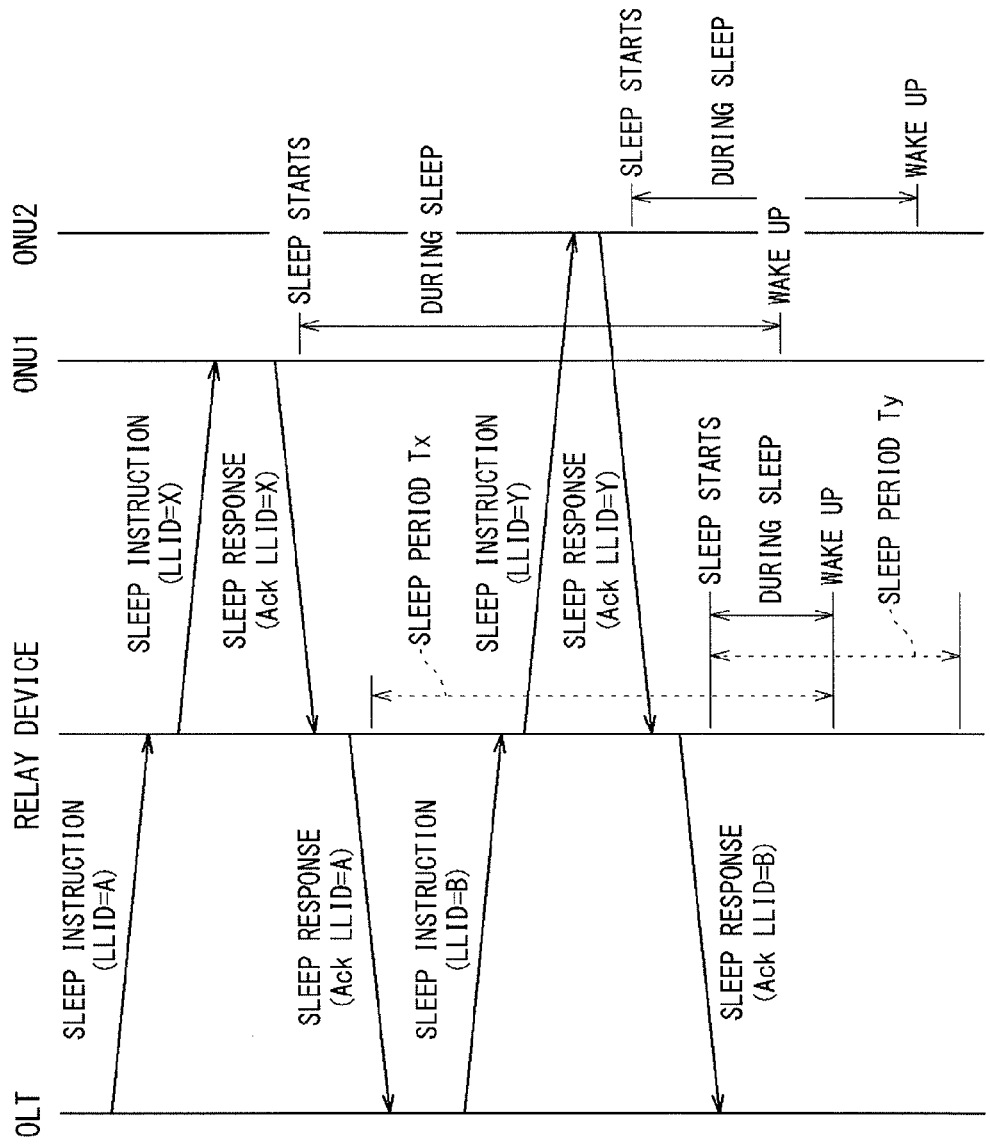
FIG. 13 is a diagram showing a sleep control sequence in an optical communication system of a fourth embodiment including a relay device.
Figure 14:
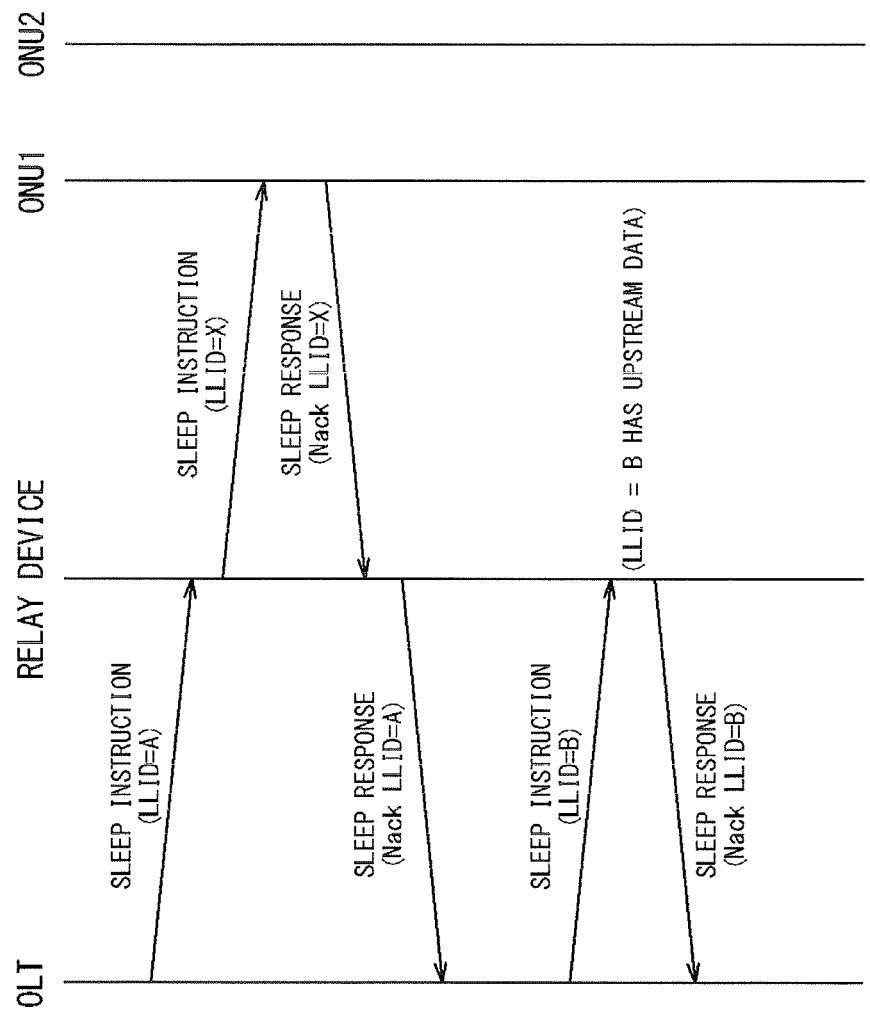
FIG. 14 is a diagram showing a sequence continued from FIG. 13.

FIGS. 13 and 14 are diagrams showing a sleep control sequence in the optical communication system of the fourth embodiment including a relay device 30. Note that FIG. 14 is a diagram continued from FIG. 13.

More specifically, FIGS. 13 and 14 show the association between sleep instruction and sleep response messages exchanged in the upper-level PON and sleep instruction and sleep response messages exchanged in the lower-level PON.

In the sleep control sequence in FIGS. 13 and 14, sleep operations performed by the OLT 10 and ONUs 20 are, as described above, the same as those in the case of a normal PON.

As shown in FIG. 13, when a control unit 34 of a relay device receives, for example, a sleep instruction for a logical link with LLID=A from the OLT, the control unit 34 checks whether there is data to be transmitted to an ONU 1 and whether there is data to be transmitted to the OLT in light of a predetermined level. If there is no data, the control unit 34 converts the logical link with LLID=A of the PON line 1 to a logical link with LLID=X of a PON line 2, and transmits a sleep instruction.

If a sleep response from the logical link with LLID=X is Ack, the control unit 34 of the relay device sends a sleep response of Ack back to the OLT through the logical link with LLID=A, and stops transmission of a normal GATE to the logical link with LLID=X only for a predetermined sleep period (hereinafter, referred to as the "sleep period Tx").

During this sleep period, the control unit 34 of the relay device maintains an MPCP link and an OAM link even if not receiving a report message or an OAM message.

In the example of FIG. 13, the control unit 34 of the relay device converts a sleep instruction for a logical link with LLID=B received from the upper-level PON, to a logical link (LLID=Y) in the lower-level PON that is associated with LLID=B, transmits a sleep instruction, and receives a sleep response of Ack from the logical link with LLID=Y.

In this case, as in the case of the ONU 1, the control unit 34 of the relay device sends a sleep response of Ack back to the OLT through the logical link with LLID=B, and stops transmission of a normal GATE to the logical link with LLID=Y only for a predetermined sleep period (hereinafter, referred to as the "sleep period Ty").

Then, when the sleep time overlapping across all of the established logical links in the PON line 2 on the lower-level side is greater than or equal to a predetermined period of time, the control unit 34 of the relay device enables a sleep signal of the relay device during that period of time.

In the example of FIG. 13, the control unit 34 of the relay device enables a sleep signal of the relay device only for a period of time where the sleep period Tx for the ONU 1 overlaps the sleep period Ty for the ONU 2.

On the other hand, as shown in FIG. 14, if the control unit 34 of the relay device receives a sleep response of Nack from the logical link with LLID=X (which may be LLID=Y), the control unit 34 sends a sleep response of Nack back to the OLT through the associated logical link with LLID=A (which may be LLID=B).

In addition, if there is data to be transmitted to the ONU 2 or there is data to be transmitted to the OLT when the control unit 34 of the relay device receives, for example, a sleep instruction for the logical link with LLID=B (which may be LLID=A), the control unit 34 transmits a sleep response of Nack to the OLT and continues normal operation.

Note that as in the case of the third embodiment the sleep period of each of the ONUs 1 and 2 may be provided as a parameter described in a sleep instruction or may be separately set in an OAM message, etc.

Note also that the control unit 34 of the relay device may allow a sleep instruction for the PON line 2 on the lower-level side to go through the first reception processing unit 33 and the downstream buffer 41. In this case, since the sleep instruction does not pass frames saved in the downstream buffer 41, when a sleep instruction is received from the OLT, it can always be determined that there is no data, without checking whether there is data to be transmitted to an ONU.

Effects of the Fourth Embodiment

According to the relay device 30 of the fourth embodiment, the following effects are further provided compared to the case of the second embodiment.

Specifically, in the relay device 30 of the fourth embodiment, the control unit 34 generates one second sleep instruction to be transmitted to an ONU 20, based on one first sleep instruction obtained from the OLT 10, according to the correspondence relationship between the PON lines 1 and 2 (in the fourth embodiment, the logical links have a one-to-one correspondence).

In addition, the control unit 34 generates one first sleep response to the first sleep instruction, based on one second sleep response to the second sleep instruction, which is obtained from the ONU 20, according to the above-described correspondence relationship.

Therefore, one first sleep instruction in the upper-level PON is converted by the relay device 30 to one second sleep instruction in the lower-level PON, and the second sleep instruction is transmitted to a specific ONU 20. One second sleep response in the lower-level PON is converted by the relay device 30 to one first sleep response in the upper-level PON, and the first sleep response is transmitted to the OLT 10.

Hence, in the fourth embodiment, the OLT 10 in the upper-level PON can intensively control the sleep operation of the ONUs 20 in the lower-level PON for upstream transmission and downstream reception. Thus, in the PON line 2 between the ONUs 20 and the relay device 30, the OLT 10 can put not only transmission operation but also reception operation to sleep.

Accordingly, an event where the relay device 30 puts upstream transmission and downstream reception to sleep just when an ONU 20 wakes up is prevented, enabling to prevent a delay in the resumption of upstream and downstream traffic.

In addition, the relay device 30 provides a second sleep instruction to an ONU 20 in one-to-one conjunction with a first sleep instruction from the OLT 10. Therefore, during the sleep period of an ONU 20, the relay device 30 does not receive downstream user frames destined for the ONU 20 from the OLT 10.

Accordingly, there is an advantage in that a memory for buffering downstream traffic during a sleep period does not need to be provided in the relay device 30. Thus, the manufacturing cost of the relay device 30 is reduced, achieving economies.

Furthermore, in the fourth embodiment, the relay device 30 can perform sleep operation where its upstream transmission function and downstream reception function are suspended, during a period during which the sleep periods Tx and Ty of ONUs 20 under the control thereof overlap each other. Thus, the power-savings of the relay device 30 can also be achieved.

<Other Variants>

The sleep operation in the fourth embodiment stops both of the transmission and reception functions, but may stop one of the transmission function and the reception function. Likewise, in the third and fourth embodiments, all of the exemplified sleep targets do not necessarily need to be stopped, and any of the targets may be stopped.

In addition, in the third and fourth embodiments, the control unit 12 of the OLT 10 or the control unit 34 of the relay device 30 stops, while a relay device 30 or an ONU 20 under the control thereof is sleeping, transmission of a normal GATE to the sleeping counterpart, but may continue transmission of a normal GATE. Then, when some kind of frame (response) is received in response to the normal GATE, the OLT 10 or the relay device 30 may cancel the sleep operation performed on a counterpart having issued the response.

REFERENCE SIGNS LIST

10: STATION SIDE DEVICE (OLT)
20: HOME SIDE DEVICE (ONU)
30: RELAY DEVICE
31: FIRST PON TRANSMITTING AND RECEIVING UNIT (FIRST TRANSMITTING AND RECEIVING UNIT)
32: FIRST TRANSMISSION PROCESSING UNIT (RELAY PROCESSING UNIT)
33: FIRST RECEPTION PROCESSING UNIT (RELAY PROCESSING UNIT)
34: CONTROL UNIT
35: SECOND RECEPTION PROCESSING UNIT (RELAY PROCESSING UNIT)
36: LLID RESOLUTION TABLE
37: SECOND TRANSMISSION PROCESSING UNIT (RELAY PROCESSING UNIT)
38: SECOND PON TRANSMITTING AND RECEIVING UNIT (SECOND TRANSMITTING AND RECEIVING UNIT)
39: FIRST UPSTREAM BUFFER (FOR CONTROL FRAMES)
40: SECOND UPSTREAM BUFFER (FOR USER FRAMES)
41: DOWNSTREAM BUFFER
42: BUFFER FOR A LOOP

The invention claimed is:

1. A relay device comprising:
a first transmitting and receiving unit that performs transmission and reception of optical signals to/from a first PON line on an upper-level side, and mutual conversion between the optical signals and electrical signals;
a second transmitting and receiving unit that performs transmission and reception of optical signals to/from a second PON line on a lower-level side, and mutual conversion between the optical signals and electrical signals;
a relay processing unit that relays a downstream frame received by the first transmitting and receiving unit to the second transmitting and receiving unit, and relays an upstream frame received by the second transmitting and receiving unit to the first transmitting and receiving unit; and
a control unit that follows upstream multiple access control performed by a station side device, for transmission of the upstream frame to be transmitted by the first transmitting and receiving unit to the station side device, and generates a control frame and inputs the control frame to the second transmitting and receiving unit as a result of independently performing upstream multiple access control for reception of the upstream frame received by the second transmitting and receiving unit from a home side device, the control frame being downwardly transmitted by the second transmitting and receiving unit to the home side device, wherein
the first transmitting and receiving unit performs upstream transmission at a higher transmission rate than that of the second transmitting and receiving unit, and the relay processing unit has an upstream buffer for absorbing a difference in upstream transmission rate between the two transmitting and receiving units.

2. A relay device comprising:
a first transmitting and receiving unit that performs transmission and reception of optical signals to/from a first PON line on an upper-level side, and mutual conversion between the optical signals and electrical signals;
a second transmitting and receiving unit that performs transmission and reception of optical signals to/from a second PON line on a lower-level side, and mutual conversion between the optical signals and electrical signals;
a relay processing unit that relays a downstream frame received by the first transmitting and receiving unit to the second transmitting and receiving unit, and relays an upstream frame received by the second transmitting and receiving unit to the first transmitting and receiving unit; and
a control unit that follows upstream multiple access control performed by a station side device, for transmission of the upstream frame to be transmitted by the first transmitting and receiving unit to the station side device, and independently performs upstream multiple access control for reception of the upstream frame received by the second transmitting and receiving unit from a home side device, wherein
the first transmitting and receiving unit performs downstream transmission at a higher transmission rate than that of the second transmitting and receiving unit, and the relay processing unit has a downstream buffer for absorbing a difference in downstream transmission rate between the two transmitting and receiving units.

3. A relay device comprising:
a first transmitting and receiving unit that performs transmission and reception of optical signals to/from a first PON line on an upper-level side, and mutual conversion between the optical signals and electrical signals;
a second transmitting and receiving unit that performs transmission and reception of optical signals to/from a second PON line on a lower-level side, and mutual conversion between the optical signals and electrical signals;
LLID resolution means for defining a logical link used in the lower-level side based on contents of a downstream frame received by the first transmitting and receiving unit or a logical link used in the upper-level side;
a relay processing unit that relays the downstream frame received by the first transmitting and receiving unit to the second transmitting and receiving unit, and buffers an upstream frame received by the second transmitting and receiving unit and relays the upstream frame to the first transmitting and receiving unit; and
a control unit that follows upstream multiple access control performed by a station side device, for transmission of the upstream frame for a case of transmitting, by the first transmitting and receiving unit, the buffered upstream frame to the station side device, and independently performs upstream multiple access control for reception of the upstream frame for a case of buffering at least one frame received by the second transmitting and receiving unit from a home side device.

4. The relay device according to claim 3, wherein the relay processing unit can perform a relay such that there is a one-to-many correspondence between a logical link of the first PON line and logical links of the second PON line.

5. The relay device according to claim 4, wherein the control unit requests the station side device to establish the logical link of the first PON line when any of the logical links of the second PON line is established, and requests the station side device to disconnect the logical link of the first PON line when all of the logical links of the second PON line are disconnected.

6. The relay device according to claim 3, wherein the relay processing unit can perform a relay such that there is a one-to-one correspondence between a logical link of the first PON line and a logical link of the second PON line.

7. The relay device according to claim 6, wherein the control unit requests the station side device to establish the logical link of the first PON line every time the logical link of the second PON line is established, and requests the station side device to disconnect the logical link of the first PON line every time the logical link of the second PON line is disconnected.

8. The relay device according to claim 6, wherein the relay processing unit:
relays a loopback set request from the station side device, to the home side device and relays a loopback set response from the home side device, to the station side device; and
relays a loopback test frame from the station side device, to the home side device and relays a loopback test frame from the home side device, to the station side device.

9. The relay device according to claim 4, wherein the relay processing unit establishes an association between the logical link of the first PON line and the logical links of the second PON line, for logical links of a same service class.

10. The relay device according to claim 6, wherein the relay processing unit establishes an association between the logical link of the first PON line and the logical links of the second PON line, for logical links of a same service class.

11. The relay device according to claim 3, wherein the control unit generates a second sleep instruction for the home side device from a first sleep instruction obtained from the station side device, according to a predetermined correspondence relationship between the two PON lines.

12. The relay device according to claim 11, wherein when the predetermined correspondence relationship is such that there is a one-to-many correspondence between a logical link of the first PON line and logical links of the second PON line,
the control unit generates a plurality of second sleep instructions for all of the logical links of the second PON line from one first sleep instruction.

13. The relay device according to claim 12, wherein the control unit performs sleep operation of the relay device where an upstream transmission function of at least one of the first transmitting and receiving unit and a part of the relay processing unit is suspended, when second sleep responses to the plurality of second sleep instructions are all Ack.

14. The relay device according to claim 11, wherein when the predetermined correspondence relationship is such that there is a one-to-one correspondence between a logical link of the first PON line and a logical link of the second PON line,
the control unit generates one second sleep instruction from one first sleep instruction, and generates one first sleep response to the first sleep instruction from one second sleep response to the second sleep instruction, the first sleep response having same acknowledge/unacknowledge content as the second sleep response.

15. The relay device according to claim 14, wherein the control unit performs sleep operation of the relay device where an upstream transmission function and/or a downstream reception function of at least one of the first transmitting and receiving unit and a part of the relay processing unit is/are suspended, during a period during which sleep periods provided based on a plurality of second sleep instructions overlap each other.

16. An optical communication system comprising:
a station side device;
a plurality of relay devices according to claim 3 connected to the station side device in a P2MP manner; and
a plurality of home side devices connected to each relay device in a P2MP manner.

17. A relay device comprising:
LLID resolution means for defining a logical link used in an lower-level side based on contents of a downstream frame received by a first transmitting and receiving unit on an upper-level side or a logical link used in the upper-level side;
a relay processing unit that relays the downstream frame received by the first transmitting and receiving unit on the upper-level side to a second transmitting and receiving unit on the lower-level side, and buffers an upstream frame received by the second transmitting and receiving unit and relays the upstream frame to the first transmitting and receiving unit; and
a control unit that follows upstream multiple access control performed by a station side device, for transmission of the upstream frame for a case of transmitting, by the first transmitting and receiving unit, the buffered upstream frame to the station side device, and independently performs upstream multiple access control for reception of the upstream frame for a case of buffering at least one frame received by the second transmitting and receiving unit from a home side device.

18. A relay method for relaying a downstream ethernet user frame received by a first transmitting and receiving unit on an upper-level side to a second transmitting and receiving unit on a lower-level side without dividing the downstream ethernet user frame, and buffering an upstream ethernet user frame received by the second transmitting and receiving unit and relaying the upstream ethernet user frame to the first transmitting and receiving unit, the method comprising:
following an instruction of a gate frame sent from a station side device as a result of upstream multiple access control performed by the station side device, for transmission of the upstream ethernet user frame for a case of transmitting, by the first transmitting and receiving unit, the buffered ethernet user upstream frame to the station side device; and
sending a gate frame to a home side device as a result of independently performing upstream multiple access control for reception of the upstream ethernet user frame for a case of buffering at least one ethernet user frame received by the second transmitting and receiving unit from the home side device.

19. The relay method according to claim 18, comprising generating a second sleep instruction for the home side device, based on a first sleep instruction obtained from the station side device, according to a predetermined correspondence relationship between a first PON line on the upper-level side and a second PON line on the lower-level side.

* * * * *